United States Patent
Harada et al.

(10) Patent No.: US 9,527,209 B2
(45) Date of Patent: Dec. 27, 2016

(54) ROBOT

(71) Applicant: Seiko Epson Corporation, Tokyo (JP)

(72) Inventors: Tomoki Harada, Matsumoto (JP); Koichi Hashimoto, Sendai (JP); Shogo Arai, Sendai (JP); Kengo Yamaguchi, Sendai (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/663,897

(22) Filed: Mar. 20, 2015

(65) Prior Publication Data

US 2015/0273688 A1 Oct. 1, 2015

(30) Foreign Application Priority Data

Mar. 25, 2014 (JP) .................. 2014-061478

(51) Int. Cl.
 *B25J 9/16* (2006.01)
 *B25J 15/00* (2006.01)

(52) U.S. Cl.
 CPC ............. *B25J 9/1612* (2013.01); *B25J 9/1697* (2013.01); *B25J 15/0042* (2013.01); *G05B 2219/39476* (2013.01); *G05B 2219/39487* (2013.01); *G05B 2219/40053* (2013.01); *G05B 2219/40583* (2013.01); *G05B 2219/40607* (2013.01)

(58) Field of Classification Search
 CPC ......... B25J 9/1612; B25J 9/163; B25J 9/1656; B25J 9/1661; B25J 9/1664; B25J 9/1669; B25J 9/1679; B25J 9/1697; B25J 13/089; B25J 15/00; B25J 15/0009; B25J 15/0028; B25J 15/0033; B25J 15/0042; B25J 15/0253–15/0293; B25J 15/08–15/12; G05B 2219/40053; G05B 2219/40607; G05B 2219/40583; G05B 2219/39509; G05B 2219/39487; G05B 2219/39476; B65G 47/905; B23P 19/007

See application file for complete search history.

(56) References Cited

U.S. PATENT DOCUMENTS 8,622,452 B2  1/2014  Yamaguchi et al.
8,678,551 B2  3/2014  Yoshida

FOREIGN PATENT DOCUMENTS

| JP | 2009-128201 A | 6/2009 |
| JP | 2010-175497 A | 8/2010 |
| JP | 2012-051279 A | 3/2012 |
| JP | 2012-130987 A | 7/2012 |
| JP | 2013-193130 A | 9/2013 |
| JP | 2013-198957 A | 10/2013 |
| JP | 2014-000627 A | 1/2014 |

(Continued)

OTHER PUBLICATIONS

Bloss, "Smart robot that picks parts from bins," 2006, Assembly Automation, pp. 279-282.*

(Continued)

*Primary Examiner* — Spencer Patton
(74) *Attorney, Agent, or Firm* — Harness, Dickey & Pierce, P.L.C.

(57) ABSTRACT

A robot includes a hand that grips an object and a control unit that operates the hand, the hand includes fingers that are able to grip the object at four or more contact points, and an object of which a metallic tone index is equal to or higher than 5 is gripped with the hand.

3 Claims, 23 Drawing Sheets

(56) References Cited

FOREIGN PATENT DOCUMENTS

JP         2014-006852 A      1/2014

OTHER PUBLICATIONS

Nieuwenhuisen et al., "Mobile Bin Picking with an Anthropomorphic Service Robot," May 2013, IEEE International Conference on Robotics and Automation (ICRA).*

K. Nosaka et al., "In-Line 3D Visual Inspection System Using Phase-Shift Method", Advanced Technologies Development Laboratory, Production Technologies Research Laboratory, vol. 57, No. 3, pp. 29-34, with English translation.

* cited by examiner

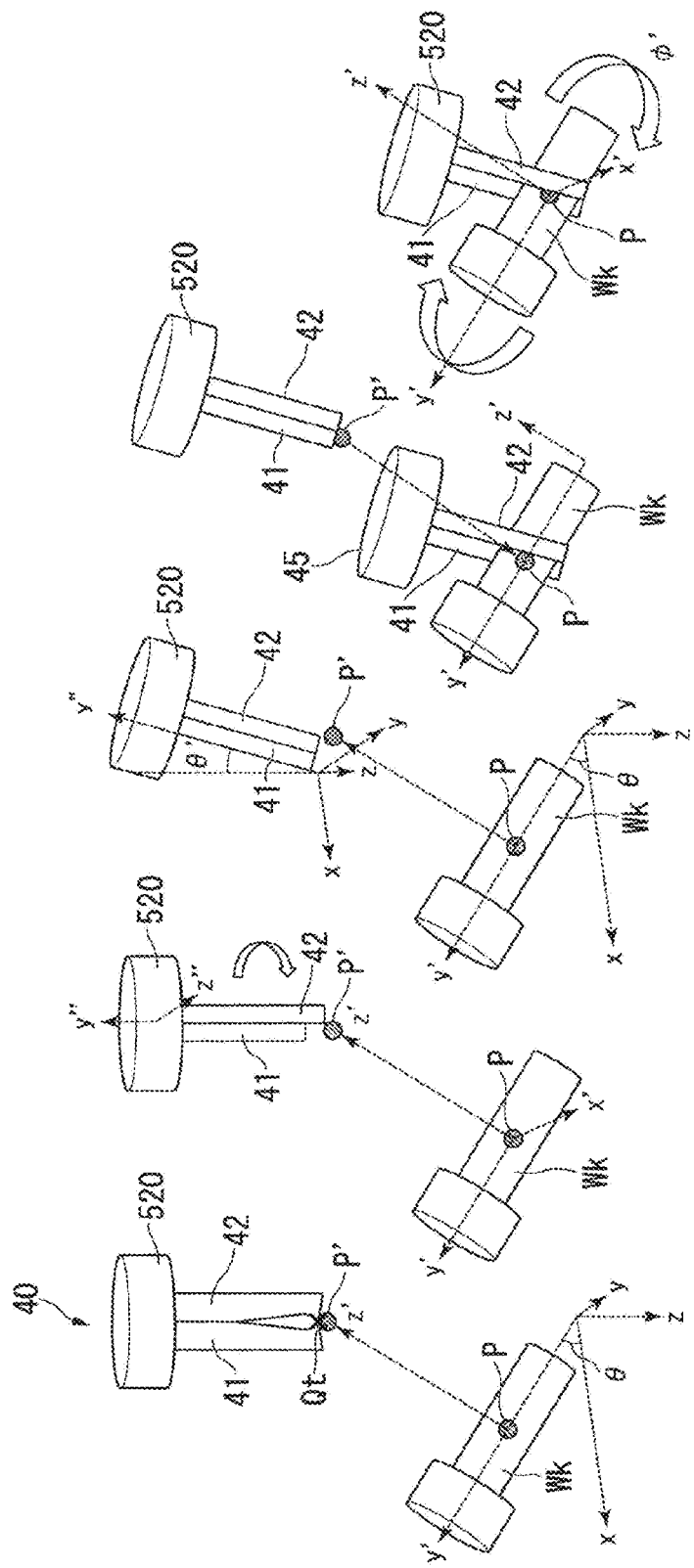

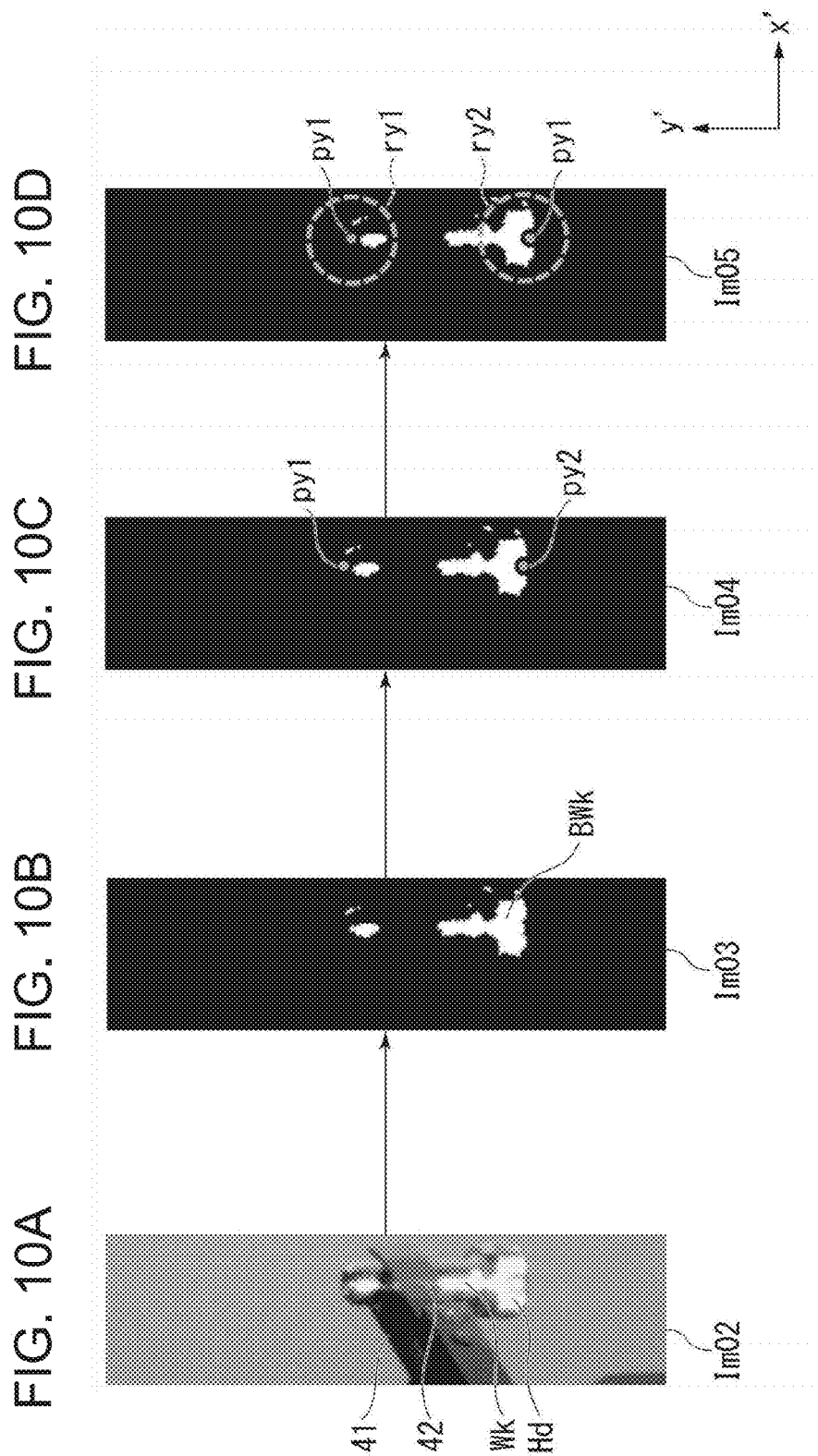

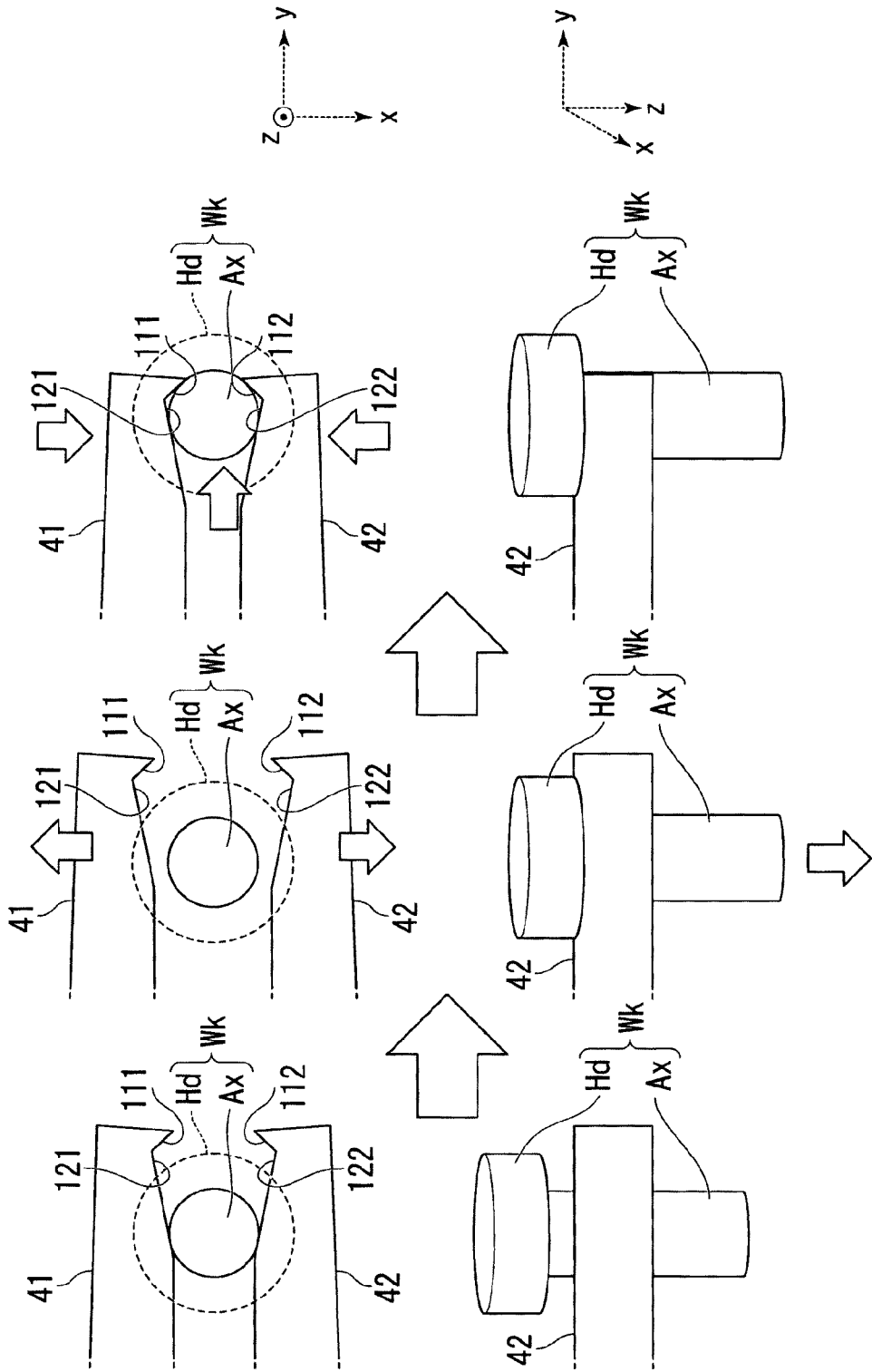

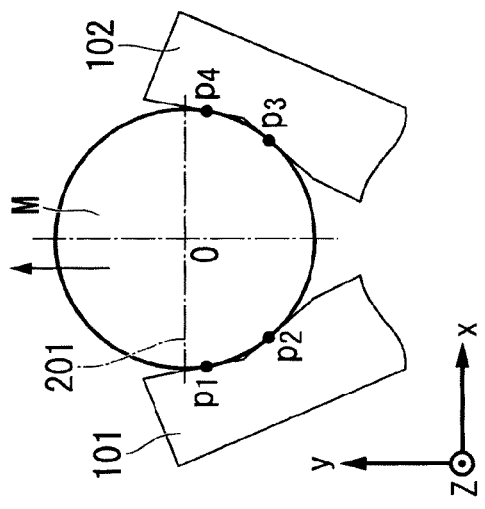
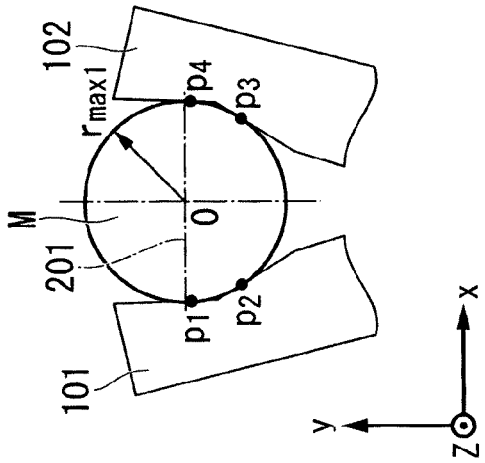
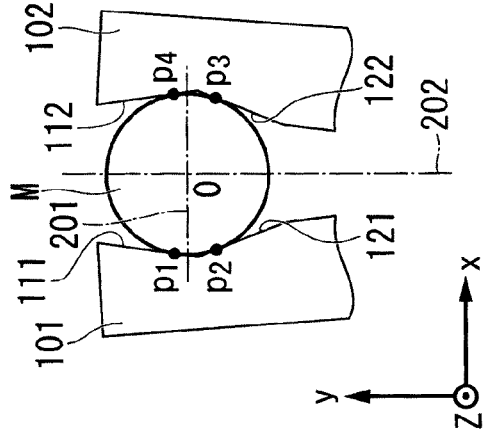

GRIPPING ENABLED

GRIPPING DISABLED
CLAW TIP IS STUCK INTO PART

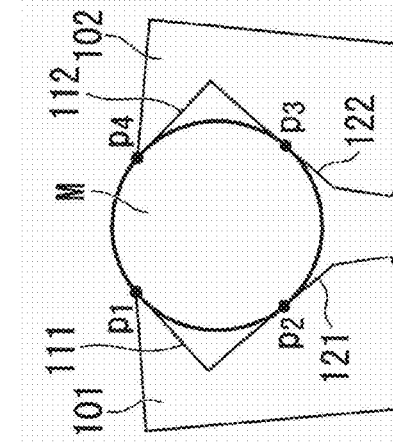
FIG. 18C
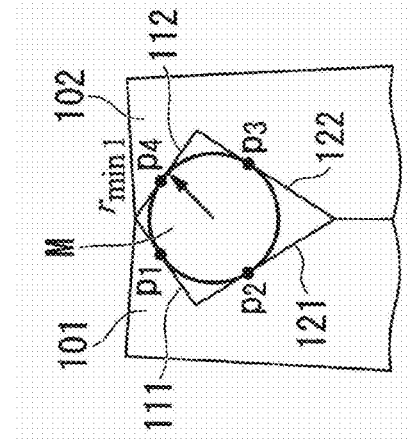
FIG. 18B
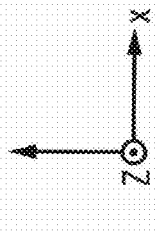
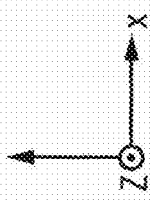
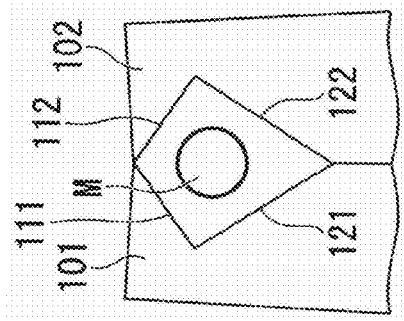
FIG. 18A
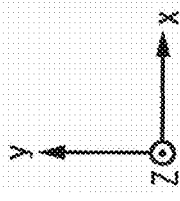

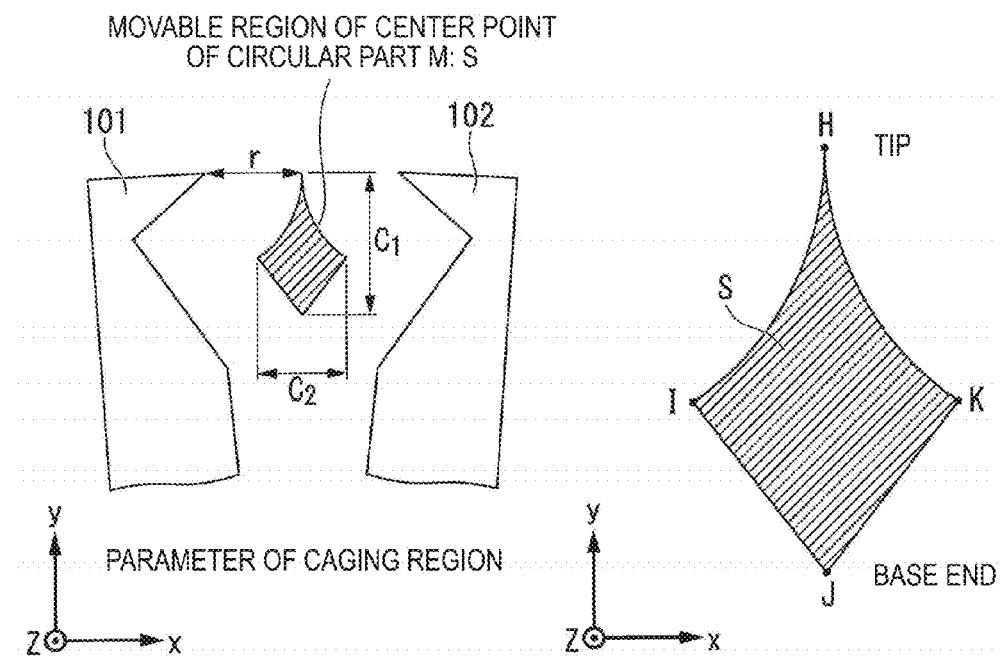

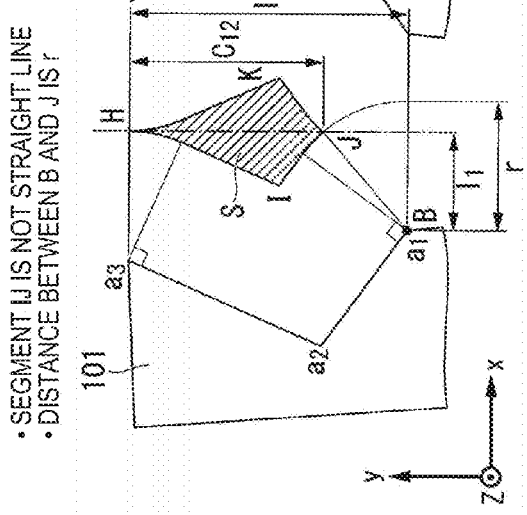

FIG. 21A
- SEGMENT IJ IS STRAIGHT LINE
- DISTANCE BETWEEN B AND J IS NOT $r$ $$l_2 - c_{11} = l_1 \tan(\beta+\theta) + \left(r - \frac{l_1}{\cos(\beta+\theta)}\right)\sin(\beta+\theta)$$
$$= \frac{r}{\sin(\beta+\theta)} - \left(\frac{1-\sin^2(\beta+\theta)}{\sin(\beta+\theta)\cos(\beta+\theta)}\right)l_1$$
$$= \left(\frac{r}{\sin(\beta+\theta)} - \frac{l_1}{\tan(\beta+\theta)}\right)$$

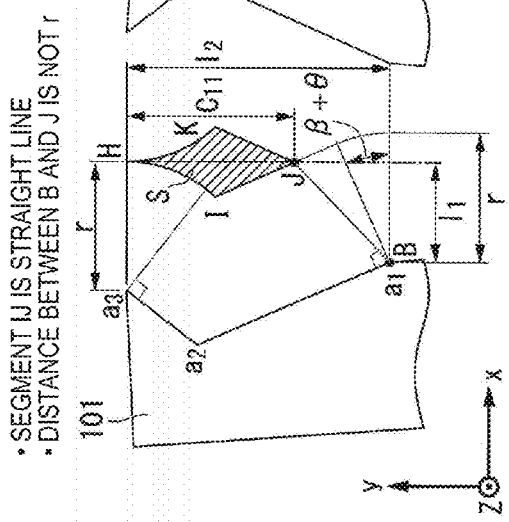

FIG. 21B
- SEGMENT IJ IS NOT STRAIGHT LINE
- DISTANCE BETWEEN B AND J IS $r$ $$l_2 - c_{12} = \sqrt{r^2 - l_1^2}$$

INTERSECTION WITH SMALLER r OUT OF INTERSECTIONS OF CURVE OF $c_1$ AND $c_2$ AND $c_{lim}$ IS $r_{max2}$

UPWARD SELF ALIGNMENT

DOWNWARD SELF ALIGNMENT $$x = \frac{d}{\sin\beta}\sin(\beta+\theta) + l\cos\gamma - l\cos(\theta+\gamma)$$

ROBOT

BACKGROUND

1. Technical Field

The present invention relates to a robot.

2. Related Art

Demand for bin picking of objects having a metallic gloss using a robot has increased more and more. Bin picking means that plural objects piled in a random manner are sequentially gripped and moved to a designated location one by one. An example of an object having a metallic gloss is a metallic bolt. When objects piled on a plane in a random manner are picked, information in a height direction (Z direction) perpendicular to the plane is necessary. Accordingly, detection of one of the objects, which have been piled on the plane, having a metallic gloss has been attempted using an image captured in a direction intersecting the plane with a general-use camera. At this time, a target might not be accurately recognized even by processing the captured image and an error in the detected position or attitude might increase. Accordingly, it has been considered that it is difficult to perform bin picking based on an image using a robot. On the other hand, when objects having a metallic gloss such as bolts are treated in a working spot, the objects might be distributed by adjusting the attitudes of the objects using a dedicated parts feeder.

JP-A-2009-128201 is an example of the related art.

Since it is difficult to treat a lot of objects at a time with a single parts feeder, the parts feeder might be used for each type of object. Accordingly, the spatial costs for installing the parts feeders and the temporal costs for treating the parts feeders have been great.

SUMMARY

An advantage of some aspects of the invention is that it provides a robot that can satisfactorily grip an object having a metallic gloss.

An aspect of the invention is directed to a robot including: a hand that grips an object; and a control unit that operates the hand, in which the hand includes fingers that are able to grip the object at four or more contact points and the object of which a metallic tone index is equal to or higher than 5 is gripped with the hand.

According to this configuration, since the fingers can grip an object at four or more contact points, it is possible to stably grip objects, which have been piled in a random manner, having a metallic gloss.

Another aspect of the invention is directed to the robot described above, wherein the control unit includes: a position and attitude calculating unit that calculates a position and attitude of the object on the basis of a three-dimensional point group obtained by imaging the object; and a grip planning unit that determines an opening and closing direction of the fingers in a direction perpendicular to a length direction of the object and an imaging direction of the object.

According to this configuration, since the imaging direction of the object and the opening and closing direction of the fingers are perpendicular to each other, accumulation of the error is not concentrated on a specific direction even when an error in the imaging direction of the position of the object based on imaging data is greater than that in the other directions and an error in the opening and closing direction of the fingers is smaller than that in the other directions. Since the fingers are opened and closed in the direction perpendicular to the length direction of the object, the hand can satisfactorily grip the object.

Still another aspect of the invention is directed to the robot described above, wherein the grip planning unit causes the hand to approach the object from a point spaced apart by a predetermined distance from the position of the object in a direction perpendicular to the length direction of the object and not having a component parallel to a plane on which the object is placed.

According to this configuration, the hand approaches the object in the direction not having a component parallel to the object to be gripped and the plane on which the object is placed with a point spaced apart by a predetermined distance from the position of the object as a base point. Accordingly, since the possibility that the hand will come in contact with the object or the plane on which the object is placed can be reduced, it is possible to satisfactorily grip the object.

Yet another aspect of the invention is directed to the robot described above, wherein the grip planning unit inclines the fingers in the same direction as the inclination of the length direction of the object about the plane from the direction perpendicular to the plane when an angle between the plane and the length direction of the object is equal to or greater than a predetermined angle threshold.

According to this configuration, when the inclination of the object from the plane on which the object is placed is great, the opening and closing direction of the fingers is inclined in a direction closer to the direction perpendicular to the length direction of the object depending on the inclination. Accordingly, even when the hand approaches the object from the direction perpendicular to the length direction of the object, it is possible to satisfactorily grip the object.

Still yet another aspect of the invention is directed to the robot described above, wherein the control unit includes an attitude control unit that adjusts attitude of the object by changing a force for gripping the object with the hand.

According to this configuration, since the attitude of the gripped object is autonomously adjusted, it is possible to skip or save manual operations associated with the adjustment.

Further another aspect of the invention is directed to the robot described above, wherein the fingers have a shape and a size enabling caging and self alignment on the object.

According to this configuration, when adjusting the attitude of the object, it is possible to utilize a gravitational force applied to the object by reducing the force for gripping the object with the hand. By increasing the force for gripping the object with the hand, it is possible to adjust the attitude of the object depending on the shape of the opposing surfaces of the pair of fingers.

BRIEF DESCRIPTION OF THE DRAWINGS

The invention will be described with reference to the accompanying drawings, wherein like numbers reference like elements.

FIGS. 9A to 9E are diagrams illustrating an example of a positional relationship between a hand and an object in the grip planning process according to this exemplary embodiment.

FIGS. 10A to 10D are diagrams illustrating a direction checking process according to this exemplary embodiment.

FIGS. 11A to 11C are diagrams illustrating an example of a positional relationship between fingers of the hand and an object in attitude control according to this exemplary embodiment.

FIGS. 14A to 14C are diagrams illustrating an object which can be gripped with the claws according to this exemplary embodiment.

FIGS. 18A to 18C are diagrams illustrating the size of a part which can be gripped when the claws are closed according to this exemplary embodiment.

FIGS. 20A and 20B are diagrams illustrating parameters of a caging region according to this exemplary embodiment.

FIGS. 21A and 21B are diagrams illustrating the shape of the caging region and parameters thereof according to this exemplary embodiment.

DESCRIPTION OF EXEMPLARY EMBODIMENTS

Figure 1:
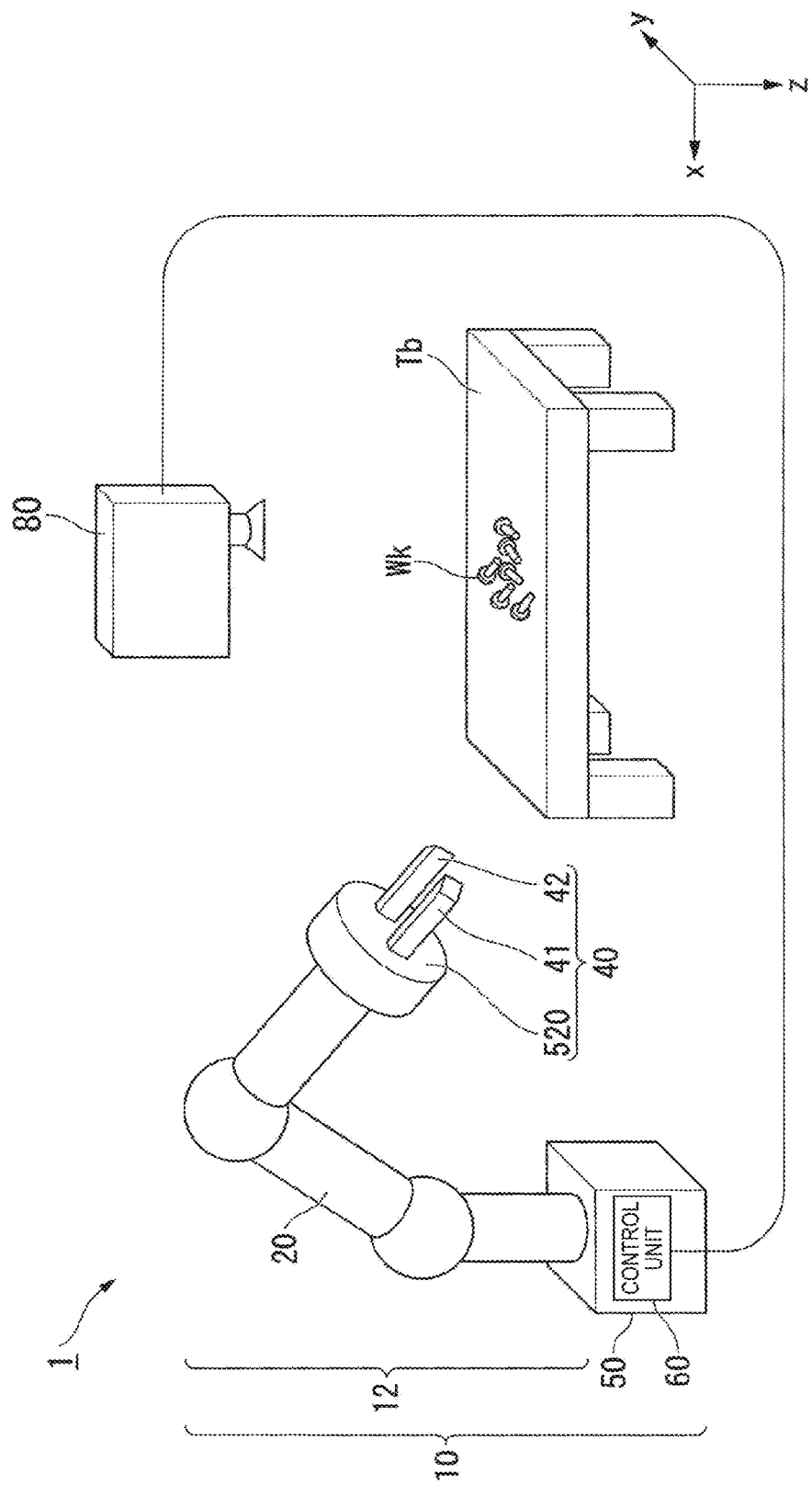
FIG. 1 is a perspective view schematically illustrating a robot system according to an exemplary embodiment of the invention.

Hereinafter, an exemplary embodiment of the invention will be described in detail with reference to the accompanying drawings.

In the drawings, scales of parts or structures may be different from actual ones for the purpose of clarifying the drawings.

FIG. 1 is a perspective view schematically illustrating a robot system 1 according to this exemplary embodiment.

As illustrated in FIG. 1, the robot system 1 includes a robot 10 and an imaging device 80.

The robot 10 includes a moving mechanism 12, a base 50, and a control unit 60. The moving mechanism 12 includes an arm 20 and a hand 40.

The robot 10 is a vertical articulated robot having six-axis degree of freedom by cooperation of the arm 20 and the hand 40. The robot 10 can freely change a position and attitude of a workpiece Wk that is gripped with the hand 40.

One end of the arm 20 is connected to the hand 40. The other end of the arm 20 is fixed to the base 50. The arm 20 includes joints at a position closer to the other end thereof than the one end and at a position closer to the one end thereof than the other end. The position of the hand 40 connected to the one end of the arm 20 is controlled by rotation of the respective joints.

The hand 40 includes two fingers 41 and 42 and a support member 520. The base ends of the fingers 41 and 42 are supported by the support member 520. On the other hand, the tips of the fingers 41 and 42 can get close to each other or be spaced apart from each other in a plane parallel to the length direction of the fingers 41 and 42. In the following description, the getting close to each other and the being spaced apart from each other are referred to as "closing" and "opening", respectively, and the "closing" and the "opening" are also referred to as "opening and closing".

The hand 40 opens the tips of the fingers 41 and 42, moves to a position at which a workpiece Wk is interposed therebetween, and then closes the tips of the fingers 41 and 42. By this operation, the hand 40 can grip the workpiece Wk. The hand 40 can carry the workpiece Wk by moving with the workpiece Wk gripped therewith. The configuration of the fingers 41 and 42 will be described later.

The support member 520 has a rotation axis in the direction in which one end of the arm 20 extends and is supported so as to be rotatable around the rotation axis. By causing the support member 520 to rotate, the direction (opening and closing direction) in which the tips of the fingers 41 and 42 are opened and closed is changed around the rotation axis.

The support member 520 includes a detection unit 63 (see FIG. 2) that detects a force and a moment for gripping a workpiece Wk. The detection unit 63 is, for example, a pressure sensor. The detection unit 63 outputs a load signal indicating the detected force and the detected moment to the control unit 60. By this configuration, a control error of the position or attitude of the hand 40 in the opening and closing direction of the fingers 41 and 42 becomes smaller than the control error in the direction of the rotation axis of the support member 520.

The robot 10 includes encoders (not illustrated) that detect an opening angle between the fingers 41 and 42, a rotation angle of the support member 520, and a rotation angle of the joints of the arm 20. The encoders generate detection signals indicating the detected opening angle, the detected rotation angle, and the like and output the generated detection signals to the control unit 60.

The base 50 is fixed to the bottom surface so as to support the moving mechanism 12. The base 50 receives the control unit 60.

The control unit 60 controls operations of one or both of the arm 20 and the hand 40. For example, the control unit 60 causes the arm 20 to operate, causes the hand 40 to move to the vicinity of a workpiece Wk, and causes the support member 520 to grip the workpiece Wk. The load signal from the detection unit 63 (FIG. 2), the detection signals from the encoders, and image data from the imaging device 80 are input to the control unit 60. The control unit 60 uses the input load signal, the input detection signals, and the input image data to control the operations of the arm 20 and the hand 40. The configuration of the control unit 60 will be described later.

The imaging device 80 images a three-dimensional point group indicating a three-dimensional shape of a subject in a predetermined three-dimensional imaging region and generates three-dimensional point group data indicating the imaged three-dimensional point group. The imaging device 80 outputs the generated three-dimensional point group data to the control unit 60. The imaging device 80 is, for example, a three-dimensional sensor for shape inspection.

In the illustrated example, the imaging device 80 is installed so that the optical axis thereof is perpendicular (directed to the lower side) to the surface of a workbench Tb parallel to the horizontal plane. In the imaging region, plural workpieces Wk as a subject are piled on the workbench Tb in a random manner. In the following description, the surface of the workbench Tb is referred to as a work plane.

The three-dimensional point group data generated by the imaging device 80 is, for example, data including position information for each of plural sample points which are obtained by sampling the three-dimensional shape with a predetermined resolution. The sample point data of each sample point represents an orthogonal coordinate (x, y, z) in a three-dimensional space obtained by sampling the surface of the subject. That is, the sample point data is data indicating the positions of the sample points obtained by sampling the surface of the subject. The imaging device 80 measures the three-dimensional coordinates of the surface of the subject for each pixel, for example, using a phase shift method. The z direction is a direction of the optical axis of the imaging device 80, and the x direction and the y direction are directions perpendicular to the z direction, respectively. In the example illustrated in FIG. 1, the z direction is directed to the left side, the y direction is a depth direction, and the z direction is directed to the lower side. The precision of the x coordinate and the y coordinate of a sample point measured using the phase shift method is relatively high (for example, an error of about ±1 mm), and the precision of the z coordinate is relatively low (for example, an error of about ±5 mm). The phase shift method will be described later. Here, (x, y, z) is referred to as a coordinate system (work plane coordinate system) based on the imaging device 80 or the work plane and is distinguished from other coordinate systems.

The imaging device 80 captures a two-dimensional image indicating a two-dimensional shape of the subject in the imaging region. The imaging device 80 generates two-dimensional image data indicating the captured two-dimensional image.

The captured two-dimensional image corresponds to an image formed by projecting the three-dimensional point group onto a plane intersecting the optical axis of the imaging device 80. That is, the two-dimensional image is an image indicating the same subject in the same imaging region as the three-dimensional point group and is correlated with the corresponding imaging region. The imaging device 80 outputs the two-dimensional image data indicating the captured two-dimensional image to the control unit 60. In the following description, the two-dimensional image data and the three-dimensional point group data are collectively simply referred to as "image data".

The configuration of the robot 10 according to this exemplary embodiment will be described below.

Figure 2:
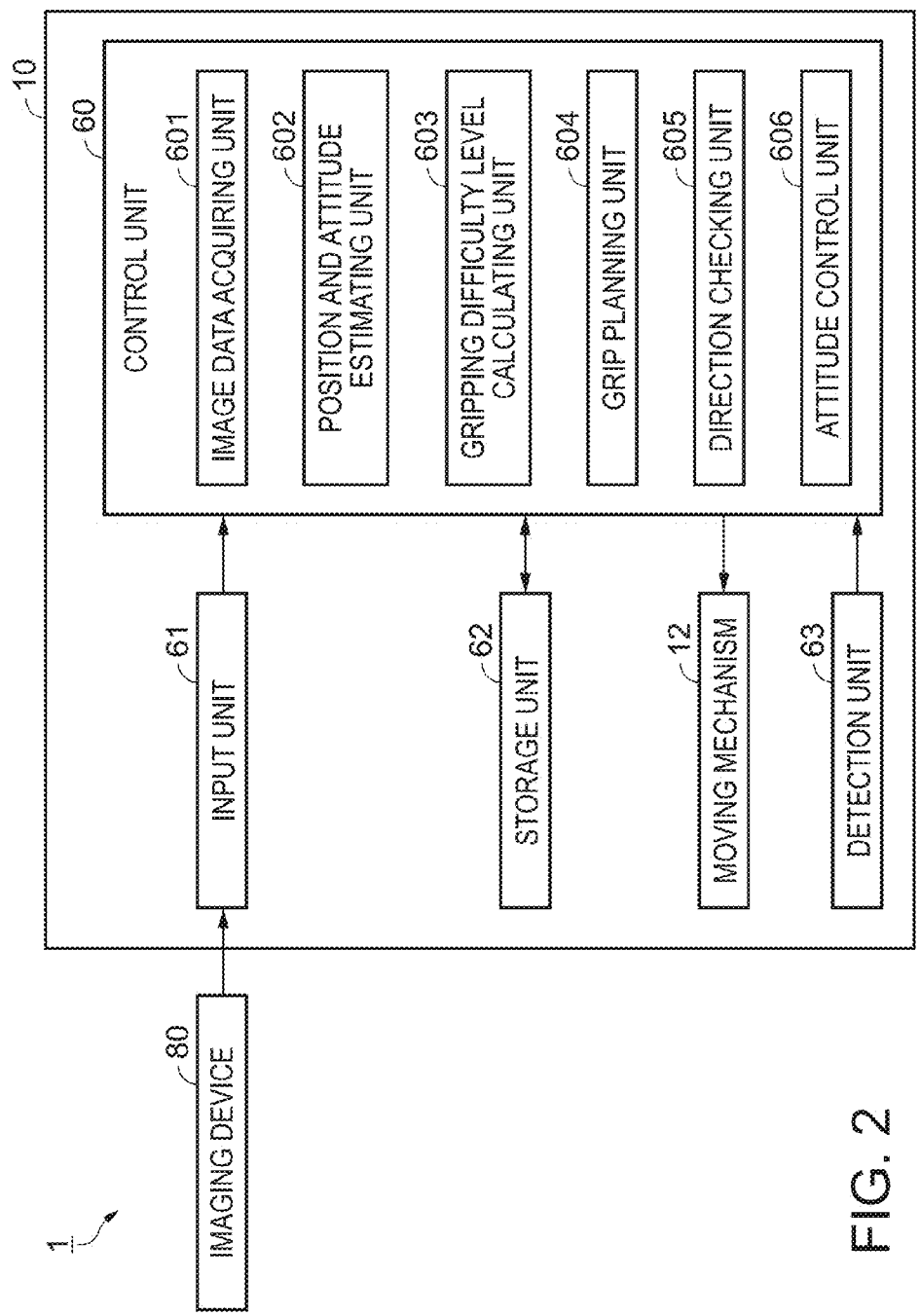
FIG. 2 is a block diagram schematically illustrating a configuration of the robot according to this exemplary embodiment.

FIG. 2 is a block diagram schematically illustrating the configuration of the robot 10 according to this exemplary embodiment.

The robot 10 includes the moving mechanism 12, the control unit 60, an input unit 61, a storage unit 62, and the detection unit 63.

The input unit 61 outputs the image data input from the imaging device 80 to the control unit 60. The input unit 61 is, for example, an input interface.

The storage unit 62 stores data used for processes performed by the control unit 60 and data generated by the processes. The storage unit 62 is, for example, a random access memory (RAM).

The control unit 60 includes an image data acquiring unit 601, a position and attitude estimating unit (position and attitude calculating unit) 602, a gripping difficulty level calculating unit 603, a grip planning unit 604, a direction checking unit 605, and an attitude control unit 606.

The two-dimensional image data and the three-dimensional point group data are input to the image data acquiring unit 601 from the imaging device 80 via the input unit 61. The image data acquiring unit 601 determines a region of interest with a predetermined size from the imaging region of the input two-dimensional image data. The region of interest is a rectangular region that is processed at a time and is a region that is estimated to include a workpiece Wk. The length of one side of the region of interest is, for example, 1 to 1.5 times the length of the workpiece Wk and the length of the other side is 3 to 4 times the radius r of the head of the workpiece Wk.

The image data acquiring unit 601 extracts two-dimensional image data indicating a two-dimensional image in the selected region of interest from the input two-dimensional image data. The image data acquiring unit 601 extracts three-dimensional point group data indicating a three-dimensional point group in a three-dimensional region corresponding to the selected region of interest from the input three-dimensional point group data.

The imaging region of the two-dimensional image indicated by the input two-dimensional image data may include plural candidates of the region of interest. The image data acquiring unit 601 selects one of the candidates as the region of interest. At the time of selecting the region of interest, the image data acquiring unit 601 extracts a bright region in which luminance value of each pixel is greater than a predetermined threshold by binarizing the two-dimensional image. The image data acquiring unit 601 extracts a continuous bright region in which the luminance value is greater than the predetermined threshold from the candidates of the region of interest and selects one of the candidates of the region of interest in which the size and the shape of the extracted bright region are within predetermined ranges, respectively. Accordingly, a region which is set to a direction having a large area with a predetermined workpiece Wk faces the imaging device 80 and which has a high possibility that a predetermined workpiece Wk is present is selected as the region of interest. The ranges of the size and shape of the bright region are determined in advance on the basis of the size and shape of the side surface of the workpiece Wk.

The position and attitude estimating unit 602 estimates plural sets of a position and attitude of a workpiece from the three-dimensional point group data extracted by the image data acquiring unit 601, for example, using a random sample consensus (RANSAC) method. The attitude of a workpiece Wk is expressed by the direction of the central axis which is the length direction thereof. An example of the process (position and attitude estimating process) of estimating the position and attitude of a workpiece Wk through the use of the position and attitude estimating unit 602 will be described later.

The gripping difficulty level calculating unit 603 calculates a gripping difficulty level of the workpiece Wk indicated by the three-dimensional point group data extracted by the image data acquiring unit 601 for each set of the position and attitude estimated by the position and attitude estimating unit 602. The gripping difficulty level is calculated by adding first to fourth evaluation index values as four parameters. The gripping difficulty level is a real number between 0 and 1 and indicates that the greater the value becomes, the more difficult the gripping becomes and the smaller the value becomes, the easier the gripping becomes. The first to fourth evaluation index values have a value between 0 and 1.

The gripping difficulty level calculating unit 603 selects a set of a position and attitude of which the calculated gripping difficulty level is the lowest. An example of the gripping difficulty level calculating process will be described later.

The grip planning unit 604 prepares a gripping plan for gripping a workpieces Wk with the hand 40 on the basis of the position and attitude selected by the gripping difficulty level calculating unit 603. In the gripping plan, the grip planning unit 604 determines a gripping standby point P' on the basis of the estimated attitude (direction of the central axis of the workpiece Wk) and position (gripping position P). The gripping standby point P' is a point located at a position spaced apart from the work plane by a predetermined distance from the gripping position P in the direction z' perpendicular to the direction y' of the central axis and not having a component parallel to the work plane. Accordingly, the gripping standby point P' is set to the direction separated from both the workpiece Wk and the work plane. Accordingly, it is possible to reduce a risk of bringing the hand 40 into contact with the work plane and the workpiece Wk when causing the gripping standby point P' to approach the gripping position P.

The grip planning unit 604 determines a direction x' perpendicular to the direction y' of the central axis and parallel to the work plane as the opening and closing direction z" of the fingers 41 and 42 of the hand 40.

As described above, the control error in the position or attitude of the hand 40 in the opening and closing direction z" may be less than the control error in the directions x" and y" perpendicular to the opening and closing direction z". On the other hand, in the position and attitude of the workpiece Wk determined from the three-dimensional point group, the error in the x direction and the y direction (including the x' direction) parallel to the work plane may be less than that in the z direction. Accordingly, since the cumulative control error is not concentrated in a specific direction but is equalized, it is possible to stably grip the workpiece Wk.

The grip planning unit 604 determines an inclination angle θ' of the hand 40 which becomes greater as the angle θ becomes greater and which is not greater than the angle θ when the angle θ between the work plane and the estimated central axis of the workpiece Wk is equal to or greater than a predetermined angle threshold. The inclination angle θ' is an angle at which the base line of the hand 40 is inclined in the same direction as the inclination of the direction y' of the central axis about the work plane from the negative z direction (which is perpendicular to the work plane). The direction of the base line of the hand 40 corresponds the length direction of the fingers 41 and 42 in a state in which the fingers 41 and 42 are closed. The direction of the base line is a direction perpendicular to the opening and closing direction z". Accordingly, even when the inclination of the central axis of the workpiece Wk about the work plane is great, the opening and closing direction of the fingers 41 and 42 is inclined to a direction close to the direction perpendicular to the central axis of the workpiece Wk depending on the inclination. Even when the hand 40 approaches from the direction perpendicular to the central axis of the workpiece Wk, it is possible to enhance the possibility of successfully gripping the workpiece Wk. The process associated with the gripping plan (grip planning process) will be described later.

The direction checking unit 605 checks whether the direction of the head at one end of the workpiece Wk is directed from the positive direction of the axis y' to the negative direction on the basis of the two-dimensional image data acquired by the image data acquiring unit 601. The direction checking unit 605 specifies a region corresponding to the region of interest out of two-dimensional images binarized by the image data acquiring unit 601. The specific region includes a bright region indicating the workpiece Wk. The direction checking unit 605 detects a pixel (pixel $y_1$) in which the y' coordinate is the largest and a pixel (pixel $y_2$) in which the y' coordinate is the smallest in the bright region included in the specified region. The direction checking unit 605 calculates the area (the number of pixels) $s_1$ and $s_2$ of the bright region included in a predetermined range (radius r') of the detected pixels $y_1$ and $y_2$. The direction checking unit 605 determines that the head of the workpiece Wk is directed to the pixel having the larger calculated area.

The attitude control unit 606 causes the hand 40 to grip the workpiece Wk and directs the direction of the head of the workpiece Wk determined by the direction checking unit 605 to the negative z direction.

The attitude control unit 606 controls the gripping attitude of the workpiece Wk by opening and closing the fingers 41 and 42 of the hand 40 and increasing and decreasing the force for griping the workpiece Wk. The control of the position or attitude of the workpiece Wk using the opening and closing of the fingers 41 and 42 of the hand 40 or the increasing and decreasing of the gripping force may also be referred to as attitude control.

The attitude control includes caging and self alignment. In the caging, the attitude control unit 606 releases the gripping of the workpiece Wk by decreasing the force for gripping the workpiece Wk with the fingers 41 and 42. Since the frictional force to the axis portion Ax of the workpiece Wk decreases, the workpiece Wk falls in the vertical direction (the positive z direction). The maximum gap between the fingers 41 and 42 is smaller than the radius of the head Hd of the workpiece Wk. Accordingly, the head Hd of the workpiece Wk is supported on the fingers 41 and 42.

Thereafter, in the self alignment, the attitude control unit 606 increases the force for gripping the workpiece Wk until the fingers 41 and 42 comes in contact with the workpiece Wk at four points, by decreasing the gap between the fingers 41 and 42. As the frictional force applied to the workpiece Wk increases, the position and attitude of the workpiece Wk vary along the shape of the opposing surfaces of the fingers 41 and 42. The hand 40 can stably grip the workpiece Wk by bringing the fingers 41 and 42 into contact with the workpiece Wk at four points. The number of times at which the attitude control unit 606 controls the attitude of each workpiece Wk is not limited to one time, and the attitude control may be performed two or more times. An example of the attitude control will be described later.

Robot Control Process

A robot control process according to this exemplary embodiment will be described below.

Figure 3:
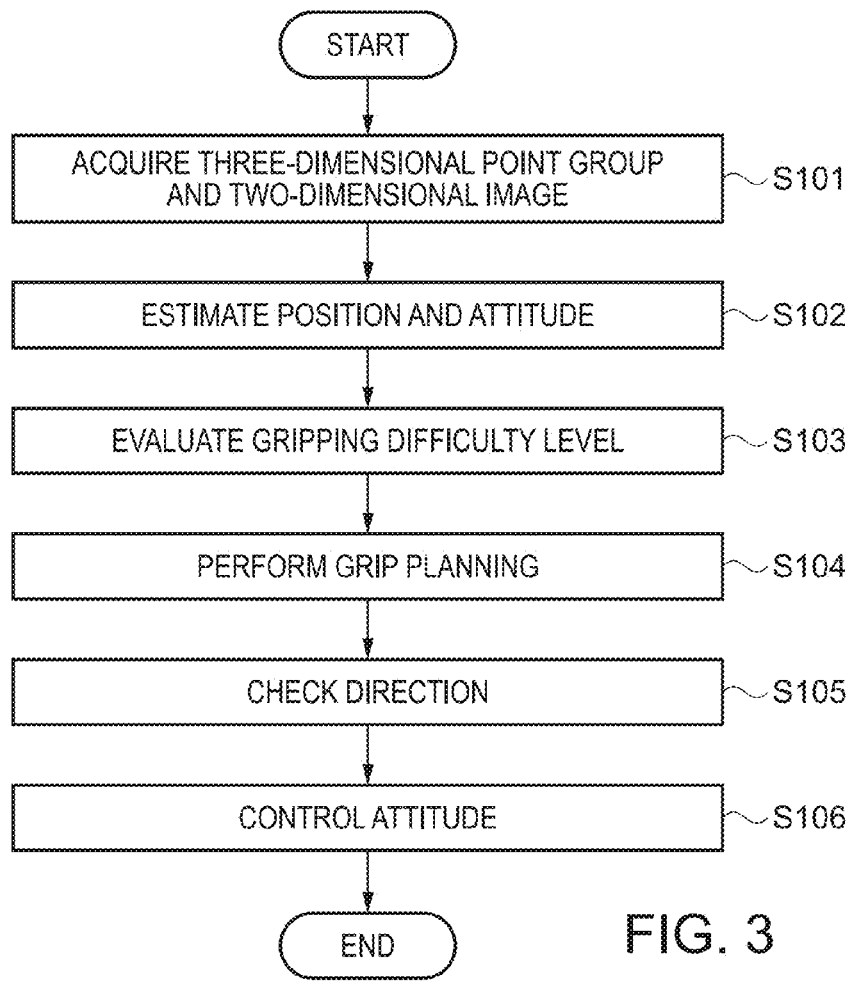
FIG. 3 is a flowchart illustrating a robot control process according to this exemplary embodiment.

FIG. 3 is a flowchart illustrating the robot control process according to this exemplary embodiment.

(Step S101) The image data acquiring unit 601 determines a region of interest with a predetermined size from the imaging region of the two-dimensional image data input from the imaging device 80 and acquires two-dimensional image data indicating a two-dimensional image in the determined region of interest. The image data acquiring unit 601 acquires three-dimensional point group data indicating a three-dimensional point group in the three-dimensional region corresponding to the region of interest determined from the input two-dimensional image data. Thereafter, the process flow moves to step S102.

(Step S102) The position and attitude estimating unit 602 estimates plural sets of a position and attitude of a workpiece Wk from the three-dimensional point group data extracted by the image data acquiring unit 601 using the RANSAC method. Thereafter, the process flow moves to step S103.

(Step S103) The gripping difficulty level calculating unit 603 calculates a gripping difficulty level of the workpiece Wk indicated by the three-dimensional point group data extracted by the image data acquiring unit 601 for each set of the position and attitude estimated by the position and attitude estimating unit 602. The gripping difficulty level calculating unit 603 selects the set of the position and attitude of which the calculated gripping difficulty level is the lowest. Thereafter, the process flow moves to step S104.

(Step S104) The grip planning unit 604 prepares a gripping plan for griping the workpiece Wk with the hand 40 on the basis of the position and attitude selected by the gripping difficulty level calculating unit 603. In the gripping plan, the grip planning unit 604 determines a gripping standby point P' on the basis of the estimated attitude and position. The grip planning unit 604 cause the hand 40 to move to the gripping standby point P' with the fingers 41 and 42 opened. The grip planning unit 604 determines the direction x' perpendicular to the direction y' of the central axis and parallel to the work plane to be the opening and closing direction z'' of the fingers 41 and 42 of the hand 40. The grip planning unit 604 determines the inclination angle θ' of the hand 40 when the angle θ between the work plane and the estimated central axis of the workpiece Wk is greater than a predetermined angle threshold. The grip planning unit 604 inclines the direction of the hand 40 at the determined inclination angle θ'. Then, the grip planning unit 604 causes the hand 40 to move from the gripping standby point P' to the gripping position P, closes the fingers 41 and 42 to grip the workpiece Wk. Thereafter, the process flow moves to step S105.

(Step S105) the direction checking unit 605 checks whether the direction of the head of the workpiece Wk as the direction of the workpiece Wk is a positive direction or a negative direction of the y' axis on the basis of the two-dimensional image data extracted by the image data acquiring unit 601. Thereafter, the process flow moves to step S106.

(Step S106) The attitude control unit 606 causes the hand 40 to grip the workpiece Wk and directs the head of the workpiece Wk to the negative z direction.

The attitude control unit 606 controls the gripping attitude of the workpiece Wk by opening and closing the fingers 41 and 42 of the hand 40 and increasing and decreasing the force for gripping the workpiece Wk. Thereafter, the process flow illustrated in FIG. 3 ends.

Example of Two-Dimensional Image

An example of a two-dimensional image acquired by the imaging device 80 will be described below.

Figure 4:
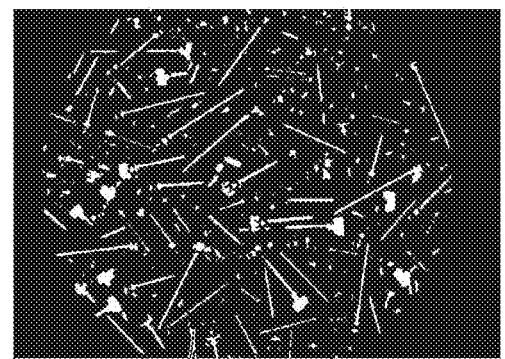
FIG. 4 is a diagram illustrating an example of a two-dimensional image.

FIG. 4 is a diagram illustrating an example of a two-dimensional image.

A two-dimensional image Im01 illustrated in FIG. 4 is an image of a subject in a predetermined region of interest. The two-dimensional image shows the surface of plural workpieces Wk piled in a random manner. Two-dimensional image data indicating the two-dimensional image represents luminance values by pixels. A darker pixel has a lower luminance value and a brighter pixel has a higher luminance value.

Example of Workpiece

In the example illustrated in FIG. 4, the workpiece Wk is a bolt having a metallic gloss. Since an object having a metallic gloss emits strong reflected light, there is a tendency to increase the luminance value. Accordingly, when the distance to the workpiece Wk is measured using the phase shift method to be described later, a phase in a spatial variation of the luminance value is detected and thus measurement accuracy may be lowered.

The workpiece Wk is an object in which a metallic tone index described in JP-A-2010-175497 is equal to or greater than 5. The metallic tone index is an index indicating a degree of metallic gloss. The greater the metallic tone index becomes, the more the metallic gloss becomes, and the smaller the metallic tone index becomes, the less the metallic gloss becomes. The metallic tone index is given as divergence in an L*-C* space of a vector (L*, C*) including brightness L* and chroma C* of light reflected from a subject as elements. The brightness L* and the chroma C* are brightness L* and chroma C* in a CIEL*a*b* color space, respectively.

A model approximating a shape of an object will be described below.

Figure 5:
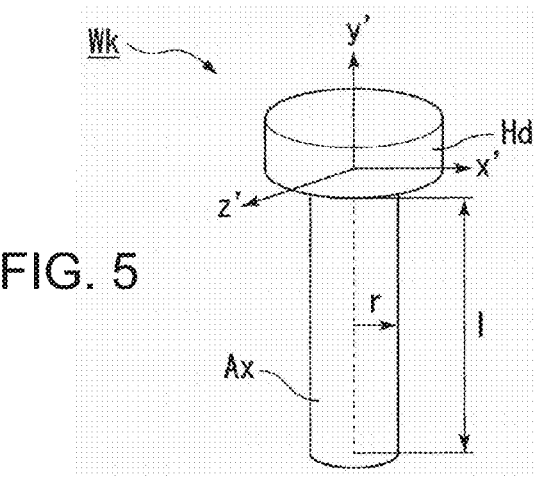
FIG. 5 is a diagram illustrating an example of a model approximating the shape of an object.

FIG. 5 is a diagram illustrating an example of the model approximating a shape of a workpiece.

A workpiece Wk is a cylindrical object of which the shape of at least part thereof approximates a cylinder. In the example illustrated in FIG. 5, the shape of the workpiece Wk includes an axis portion Ax of which the shape approximates a cylinder and a head Hd having a larger radius and a smaller length than the axis portion Ax. In this exemplary embodiment, length l and radius r are used as the characteristic length indicating the size of the workpiece Wk. The central axis of the workpiece Wk means the central axis of the axis portion Ax as long as not differentially mentioned, and the y' direction means the direction of the central axis. The x' and z directions are directions perpendicular to the y' direction. The x' direction and the z' direction are perpendicular to each other. The coordinate system expressed by the coordinates (x', y', z') in the x', y', and z' directions is referred to as a workpiece coordinate system and is distinguished from the coordinate system based on the workbench Tb or the imaging device 80.

Phase Shift Method

The phase shift method will be described below. The phase shift method is a method of projecting sinusoidal stripe patterns having different phases from a projector (not illustrated) and calculating the distance z from an imaging element to the surface of a subject for each pixel on the basis of luminance values $I_n(\xi, \eta)$ of the images obtained by projecting the patterns. Here, $\xi$ and $\eta$ represent the coordinate in the horizontal direction and the coordinate in the vertical direction on a projection device. The sinusoidal stripe pattern is an image which is expressed by a sine function in which the luminance values of the pixels forming the two-dimensional image vary with a predetermined period in the horizontal direction and are distributed constant in the vertical direction. In the phase shift method, three or more sinusoidal stripe patterns having different phases in the horizontal direction are used. When four sinusoidal stripe patterns in which the phase in the horizontal direction is $n \cdot \pi/2$ (where n is an integer of 0 to 3) are used, the imaging device 80 calculates the phase $\phi(\xi, \eta)$ for each pixel using Expression (1).

$$\phi(\xi, \eta) = \tan^{-1}\left(\frac{I_3(\xi, \eta) - I_1(\xi, \eta)}{I_0(\xi, \eta) - I_2(\xi, \eta)}\right) \quad (1)$$

The calculated phase $\phi(\xi, \eta)$ represent a distortion of the sinusoidal stripe patterns applied to a subject. The imaging device 80 detects an equiphase line AB having the same phase as the phase $\phi(\xi, \eta)$ calculated for each pixel Px out of the sinusoidal stripe patterns on the projection device of the projector. The imaging device 80 calculates the three-dimensional coordinates of the surface of the subject obtained by an intersection Qp of the straight line CoPx and the plane PoAB with the pixel Px based on the optical center coordinate Co thereof and the optical center coordinate Po of the projector.

The phase shift method is described in detail in the following document: Ken-ichiro Nosaka, Hidekazu Araki, Tomoharu Nakahara, In-Line 3D Visual Inspection System Using Phase-Shift Method, "Technical Reports of Panasonic Electric Works", Panasonic Electric Works Co., Ltd., Vol. 57, No. 3, P. 29-34, September, 2009.

Position and Attitude Estimating Process

A position and attitude estimating process will be described below.

Figure 6:
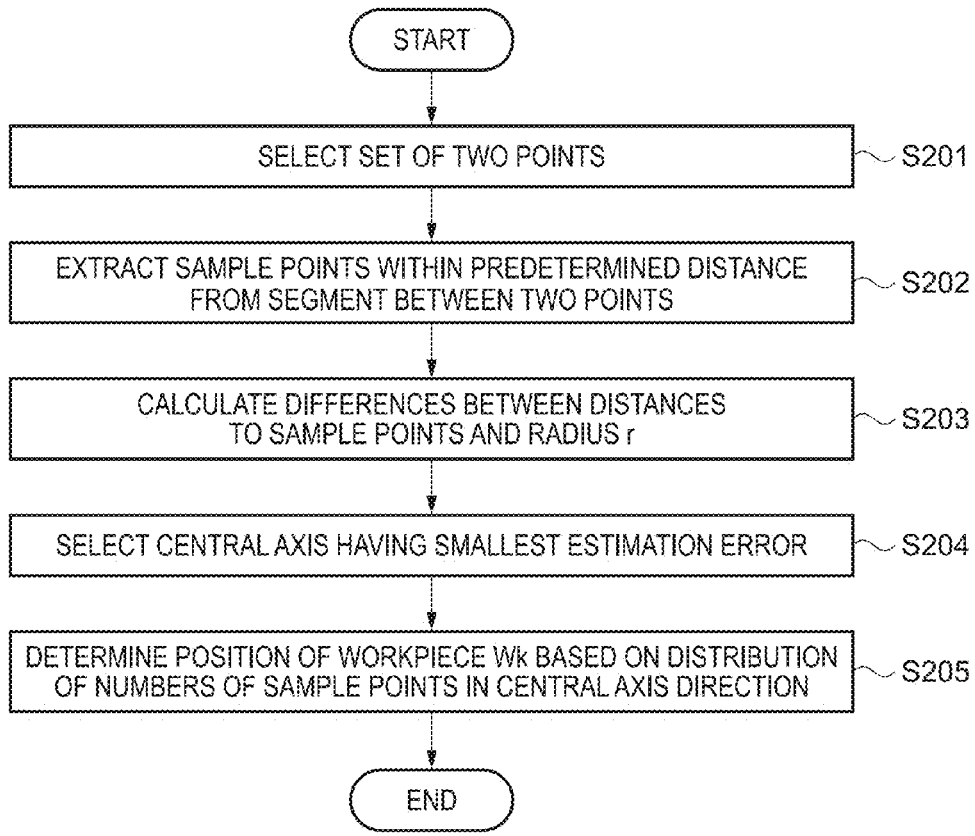
FIG. 6 is a flowchart illustrating a position and attitude estimating process according to this exemplary embodiment.

FIG. 6 is a flowchart illustrating the position and attitude estimating process according to this exemplary embodiment.

The position and attitude estimating unit 602 estimates the position and attitude of a workpiece by performing the following steps on the three-dimensional point group data extracted by the image data acquiring unit 601.

(Step S201) The position and attitude estimating unit 602 selects a set in which the length of a segment between two points is within a predetermined range out of plural sets of two sample points from the three-dimensional point group indicated by the three-dimensional point group data. The range of the length of the segment is determined in advance on the basis of the length l of the workpiece Wk. Thereafter, the process flow moves to step S202.

(Step S202) The position and attitude estimating unit 602 extracts sample points of which the distance from the segment between two points of the selected set is less than a predetermined distance from the three-dimensional point group data. The predetermined distance from the segment is determined in advance on the basis of the radius r of the axis portion of the workpiece Wk. Thereafter, the process flow moves to step S203.

(Step S203) The position and attitude estimating unit 602 selects a central axis in which the error err between the distance $d_i$ from the segment to the extracted sample point i and the radius r of the workpiece Wk is in a predetermined range. The error err is given by Expression (2). In Expression (2), $n_s$ represents the number of extracted sample points. Thereafter, the process flow moves to step S204.

$$err = \sum_{i=1}^{n_s} |d_i - r|/n_s \quad (2)$$

(Step S204) The position and attitude estimating unit 602 determines the direction of the selected central axis as the attitude of the workpiece Wk. Thereafter, the process flow moves to step S205.

(Step S205) The position and attitude estimating unit 602 counts the number of sample points for each coordinate in the direction of the selected central axis and calculates a distribution of the number of sample points in the central axis direction. The position and attitude estimating unit 602 specifies a region of the workpiece Wk on the basis of the calculated distribution and determines a region of the head and a region of the axis portion of the workpiece Wk depending on whether the number of sample points in the specified region is greater than a predetermined number. The position and attitude estimating unit 602 determines a representative point (for example, the gravitational center point) of the determined region of the axis portion to be the position of the workpiece Wk. Thereafter, the position and attitude estimating process ends.

Gripping Difficulty Level Calculating Process

A gripping difficulty level calculating process will be described below.

Figure 7:
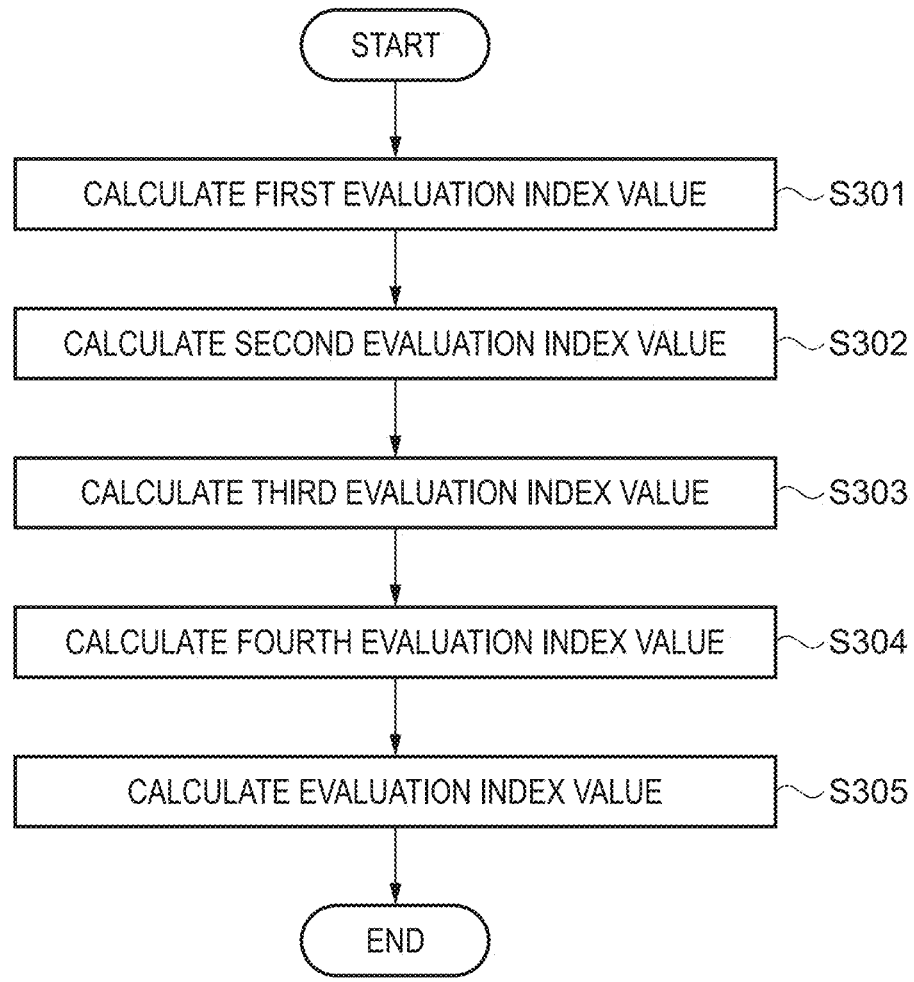
FIG. 7 is a flowchart illustrating a gripping difficulty level calculating process according to this exemplary embodiment.

FIG. 7 is a flowchart illustrating the gripping difficulty level calculating process according to this exemplary embodiment.

The gripping difficulty level calculating unit 603 calculates a gripping difficulty level by performing the following steps.

(Step S301) The gripping difficulty level calculating unit 603 calculates a first evaluation index value $y_1$ corresponding to the angle $\theta$ indicating the attitude calculated by the position and attitude estimating unit 602. The angle $\theta$ is an angle between the work plane and the central axis of the workpiece Wk. The first evaluation index value $y_1$ is a normal distribution having an optimal angle (for example, 0 degrees) as a median. The optimal angle is an angle $\theta$ optimal for gripping the workpiece Wk with the hand 40. The median and the variance of the normal distribution are determined in advance depending on the shape of the hand 40 or the shape of the workpiece Wk. Thereafter, the process flow moves to step S302.

(Step S302) The gripping difficulty level calculating unit 603 calculates a second evaluation index value $y_2$ on the basis of the three-dimensional point group data extracted by the image data acquiring unit 601. The gripping difficulty level calculating unit 603 separates the point group of the workpiece Wk and the other point group from the point group in a predetermined range, which is a part of the three-dimensional point group indicated by the three-dimensional point group data. The predetermined range is determined in advance depending on the shape of the hand 40 or the shape of the workpiece Wk. The gripping difficulty level calculating unit 603 calculates a height difference $x_2$ from the point group around the workpiece Wk by subtracting the average of the heights of the other point group from the average of the heights of the point group of the workpiece Wk. The gripping difficulty level calculating unit 603 calculates the second evaluation index value $y_2$ using Expression (3) on the basis of the height difference $x_2$. In Expression (3), $A_2$ is 1. $\rho_2$ and $\alpha_2$ are parameters depending on an environment and are determined in advance depending on the environment. $\rho_2$ represents that the greater the value becomes, the stricter the evaluation becomes. $\rho_2$ is a value greater than 1. Accordingly, the greater the height difference $x_2$ becomes, the greater the second evaluation index value $y_2$ becomes. Thereafter, the process flow moves to step S303.

$$y_2 = \frac{A_2}{1 + e^{(2x_2/\rho_2 - 1)\alpha_2}} \quad (3)$$

(Step S303) The gripping difficulty level calculating unit 603 calculates a third evaluation index value $y_3$ on the basis of the three-dimensional point group separated in step S202. The gripping difficulty level calculating unit 603 calculates a difference $x_3$ between the distance of the point group separated in step S202 from the central axis calculated by the position and attitude estimating unit 602 to the each sample point and the radius r of the axis portion of the workpiece. The difference $x_3$ represents the central axis estimation error. The gripping difficulty level calculating unit 603 calculates the third evaluation index value $y_3$ by substituting the calculated difference $x_3$ and predetermined parameters $\rho_3$ and $\alpha_3$ for $x_2$, $\rho_2$, and $\alpha_2$ of Expression (3). The value of $\rho_3$ is greater than 1 and equal to or less than about 50% of the radius r of the axis portion of the workpiece Wk. Here, the optimal value of $\rho_3$ can vary depending on the accuracy of the three-dimensional point group, the surface roughness of the workpiece Wk, and the like. Thereafter, the process flow moves to step S304.

(Step S304) The gripping difficulty level calculating unit 603 calculates a fourth evaluation index value $y_4$ on the basis of the optimal number of sample points (optimal number of points) and the number of sample points (extracted number of points) included in the three-dimensional point group separated in step S202. The optimal number of points means the number of sample points indicating the shape of the workpiece Wk under the optimal conditions for the three-dimensional point group. The gripping difficulty level calculating unit 603 calculates a ratio $x_4$ of the extracted number of points to the optimal number of points. The gripping difficulty level calculating unit 603 calculates the fourth evaluation index value $y_4$ by substituting the calculated ratio $x_4$ and predetermined parameters $\rho_4$ and $\alpha_4$ for $x_4$, $\rho_4$, and $\alpha_4$ of Expression (3). The value of $\rho_4$ is smaller than 1 and is, for example, 0.5. Accordingly, the greater the ratio $x_4$ becomes, the greater the fourth evaluation index value $y_4$ becomes. Thereafter, the process flow moves to step S305.

(Step S305) The gripping difficulty level calculating unit 603 calculates the evaluation index value by adding the calculated first to fourth evaluation index values $y_1$ to $y_4$. Thereafter, the gripping difficulty level calculating process ends.

Grip Planning Process

A grip planning process will be described below with reference to FIGS. 8 and 9.

Figure 8:
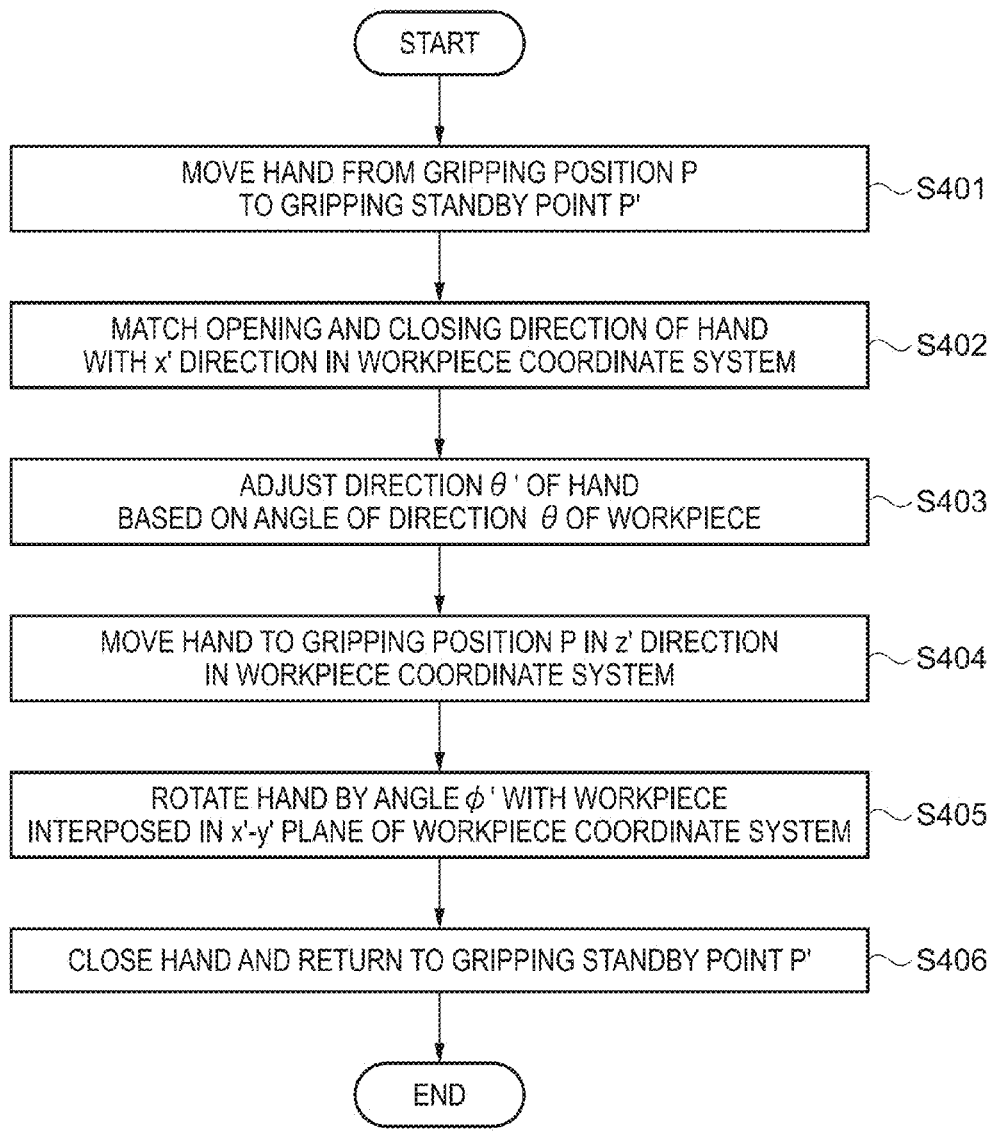
FIG. 8 is a flowchart illustrating a grip planning process according to this exemplary embodiment.

FIG. 8 is a flowchart illustrating the grip planning process according to this exemplary embodiment.

FIGS. 9A to 9E are diagrams illustrating an example of the positional relationship between the hand 40 and the workpiece Wk in the grip planning process according to this exemplary embodiment.

(Step S401) The grip planning unit 604 specifies a direction z' perpendicular to the direction y' of the central axis of the workpiece Wk and not having a component parallel to the work plane and determines a point at a position spaced apart by a predetermined distance from the work plane in the specified direction z' from the gripping position P to be a gripping standby point P' (FIG. 9A). The predetermined distance can be a distance at which the hand 40 does not come in contact with any of the workpiece Wk and the work plane even when the hand 40 moves at the gripping standby point P'. The work plane in FIG. 9A is a plane parallel to the x-y plane.

Thereafter, the grip planning unit 604 causes the hand 40 to move so that a gripping target point Qt reaches the gripping standby point P' (FIG. 9A). The gripping target point Qt is a position of a representative point (for example, the central axis) of the workpiece Wk gripped by the hand 40 and is determined depending on the shapes and the sizes of the hand 40 and the workpiece Wk. The moving of the hand 40 so that the gripping target point Qt reaches the gripping standby point P' means that the hand 40 moves to the gripping standby point P'. Thereafter, the process flow moves to step S402.

(Step S402) The grip planning unit 604 specifies a direction x' perpendicular to the direction y' of the central axis and parallel to the work plane (FIG. 9B). The grip planning unit 604 causes the support member 520 of the hand 40 to rotate and matches the opening and closing direction z" of the fingers 41 and 42 of the hand 40 with the specified direction x' (FIG. 9B). Thereafter, the process flow moves to step S403.

(Step S403) The grip planning unit 604 specifies the angle θ between the work plane and the direction y' of the central axis and determines the inclination angle θ' of the hand 40 on the basis of the specified angle θ (FIG. 9C). The grip planning unit 604 sets the inclination angle θ' to 0° when the angle θ is less than 20°, sets the inclination angle θ' to θ−20° when the angle θ is equal to or greater than 20° and less than 40°, and sets the inclination angle θ' to θ/2 when the angle θ is equal to or greater than 40°.

The grip planning unit 604 matches the direction of the base line y" of the hand 40 with a direction inclined by the inclination angle θ' from the negative z direction in the same direction as the inclination of the direction y' of the central axis about the work plane (FIG. 9C). Thereafter, the process flow moves to step S404.

(Step S404) The grip planning unit 604 opens the fingers 41 and 42 of the hand 40 and causes the hand 40 to move from the gripping standby point P' to the gripping position P (FIG. 9D). Thereafter, the process flow moves to step S405.

(Step S405) The grip planning unit 604 causes the hand 40 to rotate by a predetermined angle φ' (for example, 2° to 3°)

in the x'-y' plane with the workpiece Wk interposed therebetween before closing the fingers 41 and 42 of the hand 40 (FIG. 9E). Thereafter, the process flow moves to step S406.

(Step S406) The grip planning unit 604 closes the fingers 41 and 42 of the hand 40 to grip the workpiece Wk and causes the hand 40 to move to the gripping standby point P'. Thereafter, the grip planning process ends.

By bringing the hand 40 into contact with the workpiece Wk and into vibration in step S405, other objects can be dropped when the other objects are piled on the workpiece Wk. Accordingly, the hand 40 can grip only one workpiece Wk at a time and can avoid gripping another object together. By performing the process of step S406 in advance, the opening width of the tips of the fingers 41 and 42 of the hand 40 when the gripping is successful may be measured in advance. The control unit 60 can lower the possibility of gripping failure by gripping the workpiece Wk using the opening width obtained by the measurement.

Direction Checking

Checking of the direction of a workpiece Wk will be described below.

FIG. 10 is a diagram illustrating a direction checking process according to this exemplary embodiment.

(a) of FIG. 10 illustrates a two-dimensional image Im02 showing the fingers 41 and 42 of the hand 40 and the workpiece Wk. The workpiece Wk is gripped with the fingers 41 and 42 and the head Hd thereof is directed to the lower side in the drawing. The x' direction and the y' direction are illustrated on the right-upper side of the drawing.

(b) of FIG. 10 illustrates a two-dimensional image Im03 obtained by binarizing the two-dimensional image Im02. In the two-dimensional image Im03, the bright part is a bright region BWk indicating the workpiece Wk.

(c) of FIG. 10 illustrates a two-dimensional image Im04 in which pixels py1 and py2 are overlapped with the two-dimensional image Im03. The pixels py1 and py2 are a pixel of which the y' coordinate is the greatest in the bright region BWk of (b) of FIG. 10 and a pixel of which the y' coordinate is the smallest.

(d) of FIG. 10 illustrates a two-dimensional image Im05 in which regions ry1 and ry2 are overlapped with the two-dimensional image Im04. The regions ry1 and ry2 represent regions within a predetermined distance from the pixels py1 and py2, respectively. The direction checking unit 605 counts the area of the bright regions included in the regions ry1 and ry2 and determines that the head Hd is directed to the pixel associated with the region having the greater counted area. In the example illustrated in (d) of FIG. 10, since the area of the bright region in the region ry2 is greater than the area of the bright region in the region ry1, the direction checking unit 605 determines that the head Hd is directed to the pixel py2 (in the negative y' direction).

Attitude Control

An example of the attitude control will be described below.

FIG. 11 is a diagram illustrating an example of the positional relationship between the fingers 41 and 42 of the hand 40 and the workpiece Wk in the attitude control according to this exemplary embodiment. (a) to (c) of FIG. 11 show cross-sectional views of the fingers 41 and 42 and the workpiece Wk in the x-y plane when viewed from the upper side. In the cross-sectional views, the cross-section of the fingers 41 and 42 and the cross-sectional perpendicular to the central axis of the axis portion Ax of the workpiece Wk are indicated by a solid line. These cross-sections do not intersect the head Hd of the workpiece Wk, but the outer profile of the head Hd is indicated by a dotted line in (a) to (c) of FIG. 11. In the example illustrated in the drawing, the base ends and the tips of the fingers 41 and 42 are directed to the positive y direction and the negative y direction, respectively, and the opening and closing direction of the fingers 41 and 42 is directed to the x direction.

In the lower parts of (a) to (c) of FIG. 11, a perspective view of the finger 42 and the workpiece Wk is illustrated. The finger 41 is disposed in the negative x direction from the finger 42 and is not illustrated in the lower parts. In the example illustrated in the drawing, the head Hd is directed in the negative z direction.

(a) of FIG. 11 illustrates the positional relationship between the fingers 41 and 42 and the workpiece Wk before the attitude control unit 606 starts the attitude control. The workpiece Wk is gripped at a position close to the base ends of second inclined surfaces 121 and 122 of the fingers 41 and 42. The workpiece Wk is gripped at a position at which the fingers 41 and 42 are spaced apart in the z direction (vertical direction) from the head Hd in the axis portion Ax. The attitude control unit 606 keeps the frictional force for gripping the workpiece Wk constant to be greater than the gravitational force applied to the workpiece Wk. Accordingly, the workpiece Wk is fixed in a state in which the workpiece Wk is pinched between the fingers 41 and 42.

Thereafter, the attitude control unit 606 enlarges the gap between the fingers 41 and 42 by gradually decreasing the frictional force for gripping the workpiece Wk with the fingers 41 and 42.

(b) of FIG. 11 illustrates the positional relationship between the fingers 41 and 42 and the workpiece Wk when the gap between the fingers 41 and 42 becomes greater than the axis portion Ax by the caging of the attitude control unit 606. At this time, since the frictional force for gripping the axis portion Ax is released by the fingers 41 and 42, the workpiece Wk moves in the z direction due to the gravitational force. Here, the maximum gap between the fingers 41 and 42 is smaller than the radius of the head Hd. Accordingly, the surface directed in the z direction of the head Hd of the workpiece Wk is supported on the surfaces of the fingers 41 and 42 directed in the negative z direction.

Here, the attitude control unit 606 detects that the surface of the head Hd directed the z direction in the workpiece Wk comes in contact with the surfaces of the fingers 41 and 42 directed in the negative z direction on the basis of the load signal input from the detection unit 63. The contact with the surface directed in the negative direction can be detected on the basis of the fact that the force in the z direction indicated by the load signal is greater than a predetermined threshold. Thereafter, the attitude control unit 606 performs the control of decreasing the frictional force for gripping the workpiece Wk with the fingers 41 and 42 or stops the operation of enlarging the gap between the fingers 41 and 42. The attitude control unit 606 gradually increases the frictional force for gripping the workpiece Wk by reducing the gap between the fingers 41 and 42 (self alignment).

(c) of FIG. 11 illustrates the positional relationship between the fingers 41 and 42 and the workpiece Wk when the attitude control unit 606 gradually increases the frictional force for gripping the workpiece Wk with the fingers 41 and 42 by the self alignment. At this time, the fingers 41 and 42 come in contact with the axis portion Ax on the second inclined surfaces 121 and 122. Since the second inclined surfaces 121 and 122 are inclined in the direction in which both are spaced apart from each other as it goes from the base ends of the fingers 41 and 42 to the tips, the workpiece Wk moves to the tip of the finger 41 by increasing the frictional force applied from the fingers 41 and 42. The first inclined surfaces 111 and 112 of the fingers 41 and 42 are inclined in a direction in which both get close to each other as it goes from the base ends of the fingers 41 and 42 to the tips thereof. When the workpiece Wk comes in contact with the first inclined surfaces 111 and 112, the movement of the workpiece Wk stops.

Here, the attitude control unit 606 detects that the workpiece Wk comes in contact with the first inclined surfaces 111 and 112 on the basis of the load signal input from the detection unit 63. The contact with the first inclined surfaces 111 and 112 can be detected on the basis of the fact that the force in the negative y direction indicated by the load signal is greater than a predetermined threshold. Thereafter, the attitude control unit 606 stops the increasing of the frictional force for gripping the workpiece Wk with the fingers 41 and 42. At the time point when the movement of the workpiece Wk stops, the workpiece Wk comes in contact with the fingers 41 and 42 at total four points of the respective points of the first inclined surfaces 111 and 112 and the second inclined surfaces 121 and 122 and thus the workpiece Wk is stably gripped. In this state, the gripping of the workpiece Wk with the fingers 41 and 42 is referred to as frictional gripping.

When the direction checking unit 605 fails to estimate the direction of the head and the head of the workpiece Wk is directed in the positive z direction, the hand 40 cannot keep the gripping of the workpiece Wk. In this case, the workpiece Wk is dropped onto the workbench Tb. The attitude control unit 606 detects that the workpiece Wk is dropped on the basis of the load signal input from the detection unit 63 and then the control unit 60 may perform the robot control process (FIG. 3) on a new workpiece Wk.

Configuration of Fingers

The configuration of the fingers 41 and 42 will be described below.

Figure 12A:
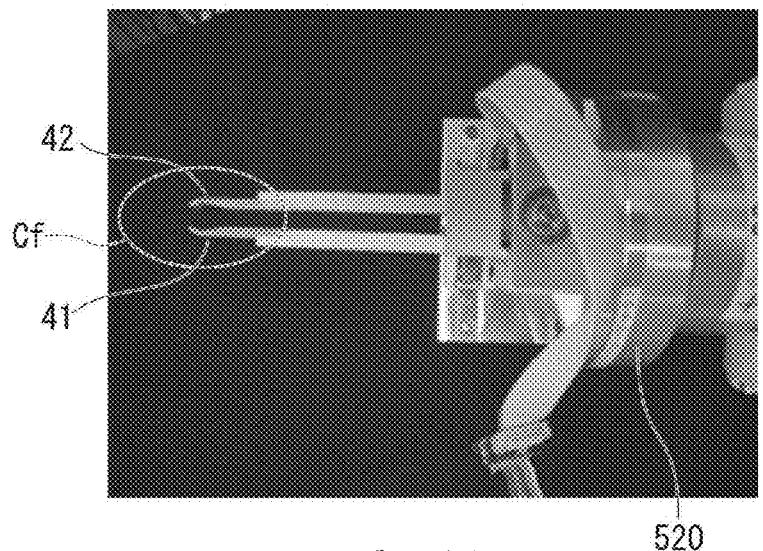
FIGS. 12A to 12C are diagrams schematically illustrating a configuration of the hand according to this exemplary embodiment.
Figures 12B, 12C:
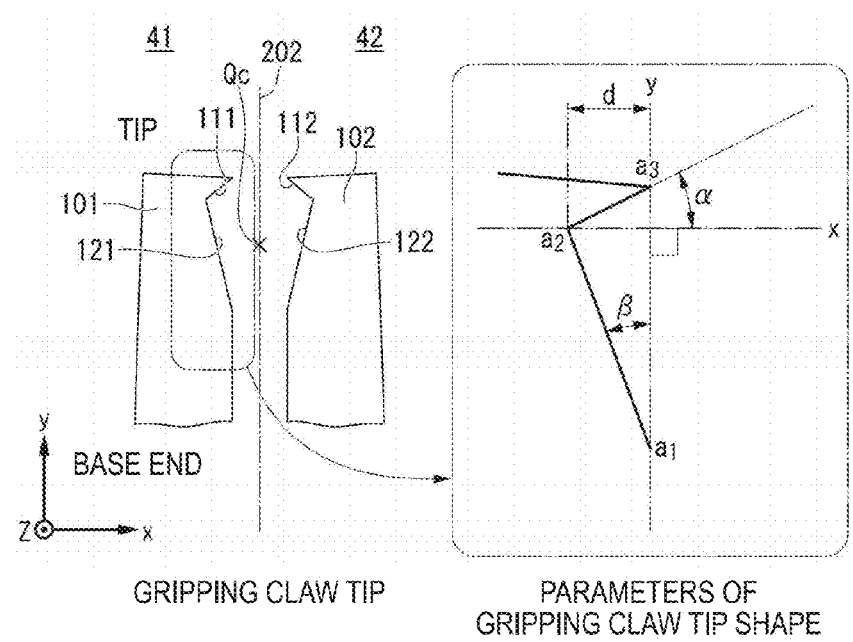

FIGS. 12A to 12C are diagrams schematically illustrating the configuration of the hand 40 according to this exemplary embodiment.

FIG. 12A is a plan view illustrating the configuration of the hand 40.

As described above, the hand 40 includes the fingers 41 and 42 and the support member 520. The base ends of the fingers 41 and 42 are supported by the support member 520 and the fingers 41 and 42 are face each other in the length direction. The direction in which the fingers 41 and 42 face each other corresponds to the opening and closing direction. The hand 40 is a precise gripping hand having a shape and a size with which the caging, the self alignment, and the frictional gripping can be performed on the workpiece Wk as will be described later. In the following description, unlike the description above, the opening and closing direction of the fingers 41 and 42 is defined as the x direction, the direction of the base line 202 is defined as the y direction, and the direction perpendicular to the x direction and the y direction is defined as the z direction.

FIG. 12B is a plan view illustrating the configuration of the fingers 41 and 42. FIG. 12B illustrates a region Cf in FIG. 12A in an enlarged view.

The finger 41 includes a claw 101 and the finger 42 includes a claw 102. The claws 101 and 102 are symmetric with respect to the base line 202. The claws 101 and 102 have the first inclined surfaces (also referred to as tip surfaces) 111 and 112 which are gradually inclined in the direction in which both are spaced apart from each other as it goes from the tips to the rear ends (also referred to as base ends or base portions) and the second inclined surfaces (also referred to as the surfaces on the base end side or the surfaces on the base portion side) 121 and 122 which are gradually inclined in the direction in which both get close to each other. The claws 101 and 102 can be formed, for example, by bending a metal (sheet metal) of aluminum or the like or cutting the metal (rectangular parallelepiped).

With this configuration, the workpiece Wk is gripped in the vicinity of the tips of the claws 101 and 102. Accordingly, since the claws 101 and 102 stably grip and carry the workpiece Wk, it is possible to realize three functions of caging, self alignment, and frictional gripping. The control unit 60 controls the claws 101 and 102 so as to grip the workpiece Wk at four or more contact points. The point Qc appearing in the base line 202 is the center point of the gripped workpiece Wk. The center point Qc can be used as the gripping target point Qt (FIG. 9A) in the aforementioned grip planning process.

The "caging" means that the workpiece Wk is located in a space closed by the pair of claws 101 and 102 when the workpiece Wk is in a certain position and attitude. In the caging, the position or attitude of the workpiece Wk is not constrained to the claws 101 and 102 but is free.

The "self alignment" means that the workpiece Wk moves to a predetermined position in the closed space through the use of the shapes of the claws 101 and 102 or the frictional force between the claws 101 and 102 and the workpiece Wk when the claws 101 and 102 pinch the workpiece Wk therebetween as described above.

The "frictional gripping" means that the claws 101 and 102 come in contact with the workpiece Wk at four or more points to constrain the workpiece Wk and the workpiece Wk is constrained and gripped in the direction perpendicular to the surface on which the object Wk is placed using the frictional force.

As illustrated in FIG. 12B, the tip of the claw 101 has a triangular (concave) shape (hereinafter, referred to as claw shape) surrounded with vertices $a_1$, $a_2$, and $a_3$. This claw shape is expressed by three parameters $\alpha$, $\beta$, and d. The parameter $\beta$ represents an angle formed by a segment $a_1a_2$ and a segment $a_1a_3$, and the parameter $\alpha$ represents an angle formed by a segment $a_2a_3$ and a perpendicular line when the perpendicular line (also referred to as base line) is drawn from the vertex $a_2$ to the segment $a_1a_3$. The parameter d represents the height ($=a_2a_3 \cos \alpha$) to the bottom side $a_2$ of the triangle $a_1a_2a_3$. The point $a_2$ which is an intersection of the first inclined surface 111 and the second inclined surface 121 is also referred to as a base point.

In the claw 101, allowable ranges of the parameters $\alpha$, $\beta$, and d of the claw shape are $0<d$, $0<\alpha<\pi/2$, and $0<\beta<\pi/2$, respectively.

Figures 13A, 13B:
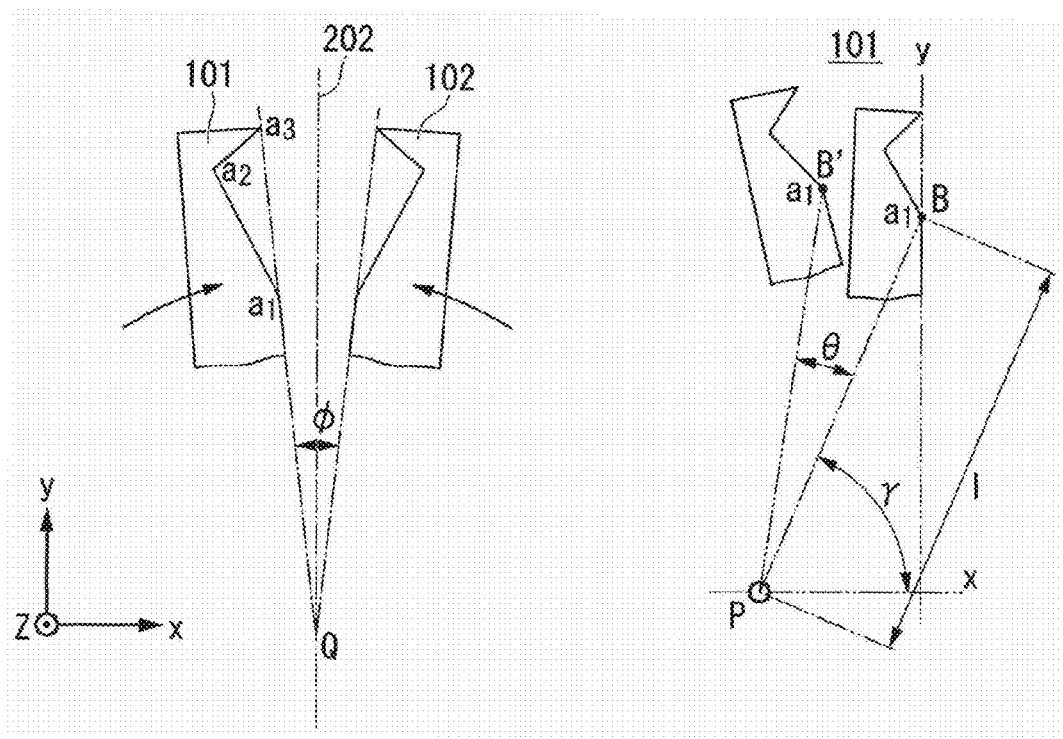
FIGS. 13A and 13B are diagrams illustrating a claw opening and closing mechanism according to this exemplary embodiment.

FIGS. 13A and 13B are diagrams illustrating an opening and closing mechanism of the claw according to this exemplary embodiment.

As illustrated in FIG. 13A, the control unit 60 opens and closes the claw 101 and the claw 102 by controlling the angle $\phi$ formed by lines extending the sides $a_1a_3$ about an intersection Q of extension lines of segments connecting the vertices $a_1$ and $a_3$.

As illustrated in FIG. 13B, three parameters for opening and closing the claw 101 (hereinafter, referred to as opening and closing parameters) are defined as $\theta$, $\gamma$, and l. In FIG. 13B, the point P represents a rotation center and the parameter l represents the distance from the point P to the bottom end $a_1$ (point B, which is also referred to as an end of the surface on the base end side) of the triangle $a_1a_2a_3$ of the claw 101. The parameter $\gamma$ represents an angle formed by a segment BP when the claws 101 and 102 are closed and the x axis, and the parameter θ represents an angle formed by the segment BP when the claws 101 and 102 are closed and the segment B'P when the claw 101 is opened.

The conditions of the parameters α, β, and d of the claw shape will be described below.

The conditions which the parameters α, β, and d should satisfy are a frictional gripping condition, a casing condition, and a self alignment condition.

Frictional Gripping Condition

First, the frictional gripping condition will be described below. The condition in which the claw 101 and the claw 102 grip the workpiece Wk is that the claws 101 and 102 come in contact with the workpiece Wk at four or more contact points and constrain the workpiece (frictional gripping condition). The frictional gripping condition depends on the size of the workpiece Wk.

FIG. 14 is a diagram illustrating an object that can be gripped by the claws 101 and 102 according to this exemplary embodiment. In the drawing, the shape of a part M to be gripped by the claw 101 and the claw 102 is a circular shape (for example, a cylindrical shape) when viewed in the x-y plane. In the following description, the triangular shape of the tips of the claw 101 and the claw 102 will be described in order to calculate the parameters α, β, and d of the claw shape. In the following description, gripping portions having different parameters α, β, and d of the claw shape are referenced by the same reference signs 101 and 102 and are also referred to as the claws 101 and 102. Workpieces Wk having different sizes to be gripped by the claw 101 and the claw 102 are referenced by common reference sign M and are referred to as parts M.

As illustrated in (a) to (c) of FIG. 14, the contact point of the first inclined surface 111 of the claw 101 and the part M is referred to as a point $p_1$, the contact point of the second inclined surface 121 of the claw 101 and the part M is referred to as a point $p_2$, the contact point of the first inclined surface 112 of the claw 102 and the part M is referred to as a point $p_4$, and the contact point of the second inclined surface 122 of the claw 102 and the part M is referred to as a point $p_3$. The center point o of the part M is located in the base line 202 and a segment passing through the center point and perpendicular to the base line 202 is referred to as a central line 201.

(a) of FIG. 14 is a diagram illustrating a part that can be gripped with the claw 101 and the claw 102, (b) of FIG. 14 is a diagram illustrating a part with a maximum size that can be gripped with the claw 101 and the claw 102, and (c) of FIG. 14 is a diagram illustrating a part that cannot be gripped with the claw 101 and the claw 102.

As illustrated in (a) of FIG. 14, the central line 201 is located between a segment connecting the contact points $p_1$ and $p_4$ and a segment connecting the contact points $p_2$ and p3. In this state, since the claw 101 and the claw 102 can grip the part M so as to surround the part M at four contact points, the part M is stably gripped by the frictional gripping.

As illustrated in (c) of FIG. 14, the central line 201 is located closer to the positive side in the y direction than the segment connecting the contact points $p_1$ and $p_4$. In this state, since the claw 101 and the claw 102 cannot grip the part M so as to surround the part M at four contact points, the part M may not be stably gripped by the frictional gripping. For example, when the friction coefficient between the part M and the claw 101 and the claw 102 is less than a predetermined value, the part M may depart and protrude in the positive y direction from the frictionally-gripped state.

Accordingly, the maximum size of the part M which can be gripped with the claw 101 and the claw 102 is a size when the central line 201 corresponds to the segment connecting the contact points $p_1$ and $p_4$ as illustrated in (b) of FIG. 14. The maximum radius of the part M that can be gripped by the surfaces (the first inclined surfaces 111 and 112 and the second inclined surfaces 121 and 122) of the claw 101 and the claw 102 is defined as $r_{max1}$ (hereinafter, referred to as a maximum gripping size).

Figure 15:
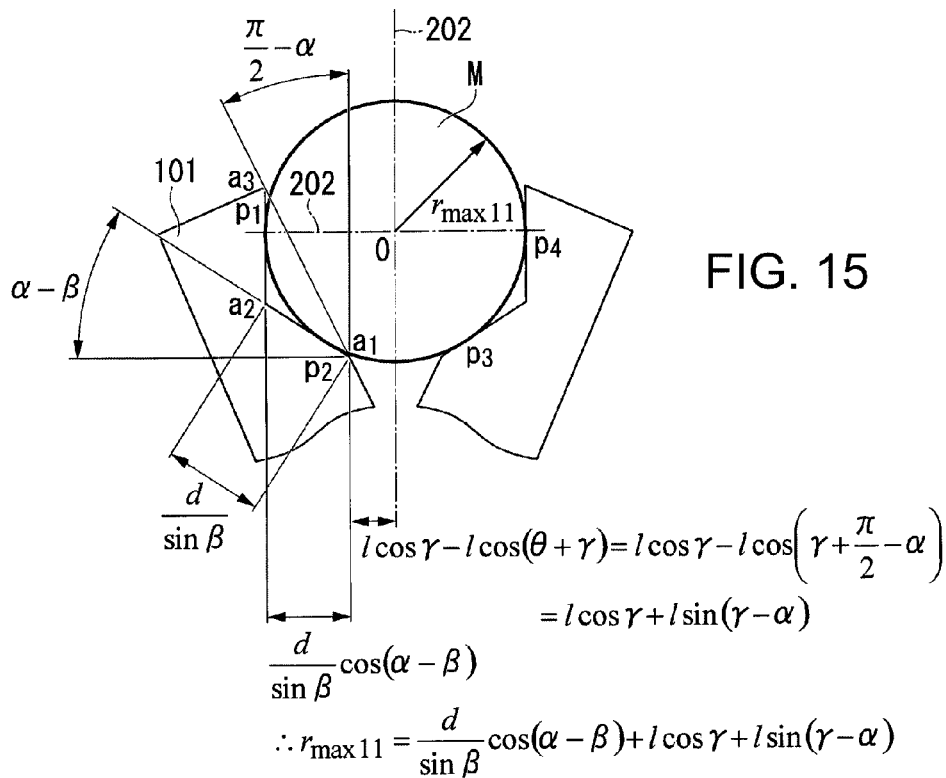
FIG. 15 is a diagram illustrating a maximum size which can be gripped and shape parameters of the claws according to this exemplary embodiment.

FIG. 15 is a diagram illustrating the relationship between the maximum gripping size and the parameters α, β, and d of the claw shape according to this exemplary embodiment. As illustrated in FIG. 15, the part M is surrounded at four contact points $p_1$ to $p_4$. That is, all the contact points $p_1$ to $p_4$ and the part M are located on the surfaces (the first inclined surfaces 111 and 112 and the second inclined surfaces 121 and 122) of the claw 101 and the claw 102. In this way, the maximum gripping size with which the part M can be surrounded at four contact points is defined as $r_{max11}$.

Figure 16A:
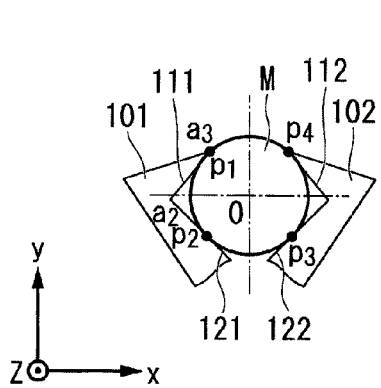
FIGS. 16A and 16B are diagrams illustrating a size of a part which can be gripped depending on a relationship between vertices of the claws and the part according to this exemplary embodiment.
Figure 16B:
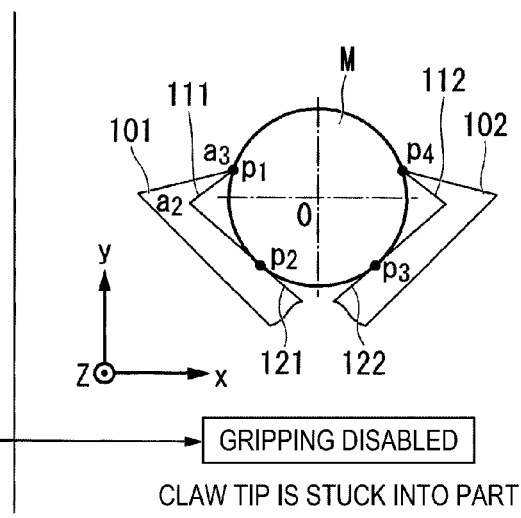
Figure 17A:
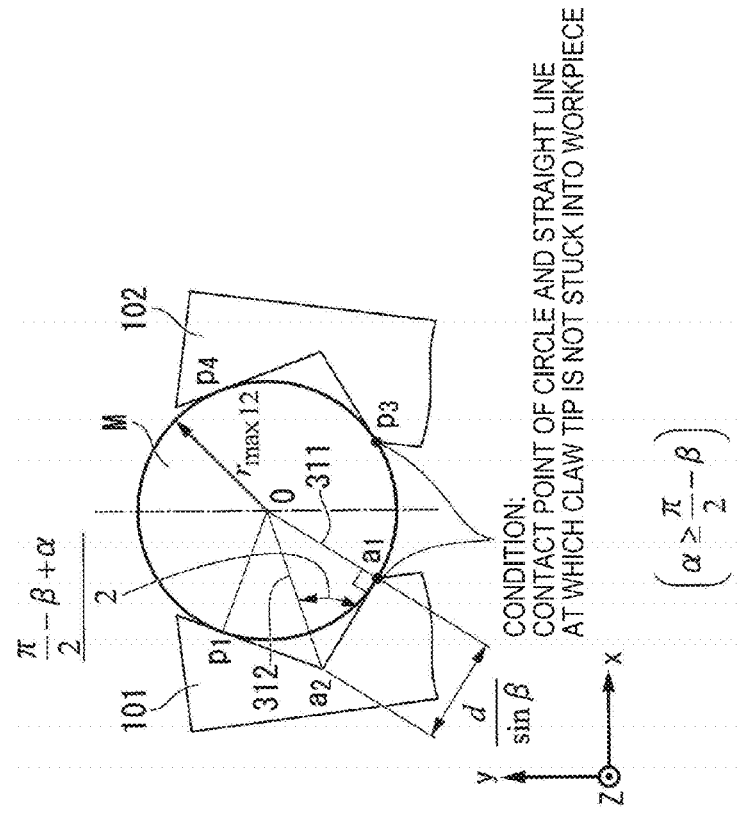
FIGS. 17A and 17B are diagrams illustrating a relationship between the vertices of the claws and the part according to this exemplary embodiment.
Figure 17B:
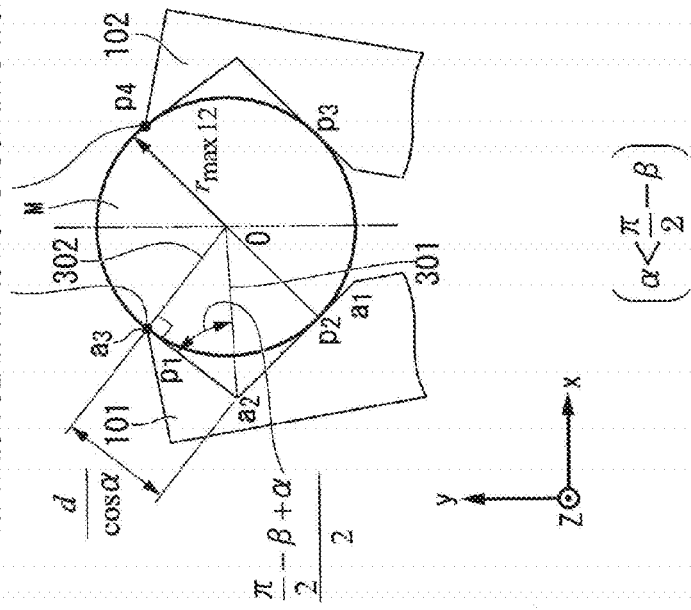

FIG. 16 is a diagram illustrating the size of a part that can be gripped depending on the relationship between the vertices of the claws and a part according to this exemplary embodiment. FIGS. 17A and 17B are diagrams illustrating a relationship between the vertices of the claws and a part according to this exemplary embodiment.

(a) of FIG. 16 is a diagram illustrating a case in which a part can be gripped and (b) of FIG. 16 is a diagram illustrating a case in which a part cannot be gripped. The part M may be formed of a resin softer than the material of the claw 101 and the claw 102.

As illustrated in (a) of FIG. 16, the part M comes in contact with the second inclined surface 121 of the claw 101 at the contact point $p_2$ and comes in contact with the second inclined surface 122 of the claw 102 at the contact point $p_2$. The part M does not come in contact with the first inclined surface 111 of the claw 101 and comes in contact with the vertex $a_3$ (contact point $p_3$) of a triangle $a_1 a_2 a_3$ at the tip of the claw 101. At the contact point $p_1$, the side $a_2 a_3$ of the triangle $a_1 a_2 a_3$ of the claw 101 is a tangent of the part M. Accordingly, the vertex $a_3$ of the claw 101 is not stuck into the part M.

On the other hand, as illustrated in (b) of FIG. 16, the part M comes in contact with the second inclined surface 121 of the claw 101 at the contact point $p_2$ and comes in contact with the second inclined surface 122 of the claw 102 at the contact point $p_3$ similarly to (a) of FIG. 16. However, the vertex $a_3$ of the claw 101 and the part M come in contact with each other at the contact point $p_1$. In this case, at the contact point $p_1$, the side $a_2 a_3$ of the triangle $a_1 a_2 a_3$ of the claw 101 is not a tangent of the part M. Accordingly, the vertex $a_3$ of the claw 101 is stuck into the part M.

That is, in the condition of the maximum gripping size, the vertex $a_3$ or the vertex $a_1$ of the claw 101 does not have to be stuck into the part M.

Hereinafter, the vertices $a_3$ of the claw 101 and the claw 102 and the vertices $a_1$ of the claw 101 and the claw 102 are referred to as claw tips.

FIG. 17A is a diagram illustrating a condition in which the vertices $a_3$ of the claw 101 and the claw 102 are not stuck into a part M. FIG. 17B is a diagram illustrating a condition in which the vertices $a_1$ of the claw 101 and the claw 102 are not stuck into a part M. FIG. 17A is different from FIG. 17B, in whether the parameter α of the claw shape is less than π/2−β or equal to or greater than π/2−β. In this way, the maximum gripping size in consideration of the condition in which the claw tips are not stuck is defined as $r_{max12}$.

As a result, as illustrated in FIGS. 15 and 17, the maximum gripping size $r_{max1}$ is given by Expressions (4) to (6)

using the parameters α, β, and d of the claw shape and the opening and closing parameters θ, γ, and l on the basis of the geometrical relationship.

$$r_{max1} = \min\{r_{max11}, r_{max12}\} \quad (4)$$

$$r_{max11} = \frac{d}{\sin\beta}\cos(\alpha - \beta) + l\cos\gamma + l\sin(\gamma - \alpha) \quad (5)$$

$$r_{max12} = \begin{cases} \frac{d}{\cos\alpha}\tan\left(\frac{\frac{\pi}{2} - \beta + \alpha}{2}\right), & \text{if } \alpha < \frac{\pi}{2} - \beta \\ \frac{d}{\sin\beta}\tan\left(\frac{\frac{\pi}{2} - \beta + \alpha}{2}\right), & \text{if } \alpha \geq \frac{\pi}{2} - \beta \end{cases} \quad (6)$$

In Expression (4), which of $r_{max11}$ and $r_{max12}$ should be selected as $r_{max1}$ depends on the shape of the claw tip. In Expression (6), $r_{max12} = d/\cos(\alpha) \times \tan((\pi/2 - \beta + \alpha)/2)$ is established when α is less than $\pi/2 - \beta$, and $r_{max12} = d/\sin((\beta) \times \tan((\pi/2 - \beta + \alpha)/2)$ is established when α is equal to or greater than $\pi/2 - \beta$.

The state in which the claw 101 and the claw 102 are closed will be described below.

FIG. 18 is a diagram illustrating the size of a part that can be gripped when the claws are closed according to this exemplary embodiment. When the claw 101 and the claw 102 are closed as illustrated (b) of FIG. 18, the first inclined surfaces 111 and 112 and the second inclined surfaces 121 and 122 of the claw 101 and the claw 102 come in contact with the part M at the contact points $p_1$ to $p_4$. The minimum size of the part M that can be gripped with the claw 101 and the claw 102 in this state is $r_{min1}$.

On the other hand, as illustrated in (a) of FIG. 18, when the part M is small and the claw 101 and the claw 102 are closed, the part M cannot come in contact with the claw 101 and the claw 102 at all of four contact points $p_1$ to $p_4$. In this state, the part M cannot be gripped with the claw 101 and the claw 102 (gripping impossible).

As illustrated in (c) of FIG. 18, the rear end of the part M comes in contact with the second inclined surfaces 121 and 122 of the claw 101 and the claw 102 at the contact points $p_2$ and $p_3$. The contact points $p_1$ and $p_4$ of the tip of the part M and the claw 101 and the claw 102 are the tips $a_3$ of the claw 101 and the claw 102. The segment $a_2a_3$ is a tangent of the part M. In this state, as described with reference to FIGS. 17A and 17B, the claw 101 and the claw 102 are not stuck into the part M and thus the gripping is possible.

Figure 19:
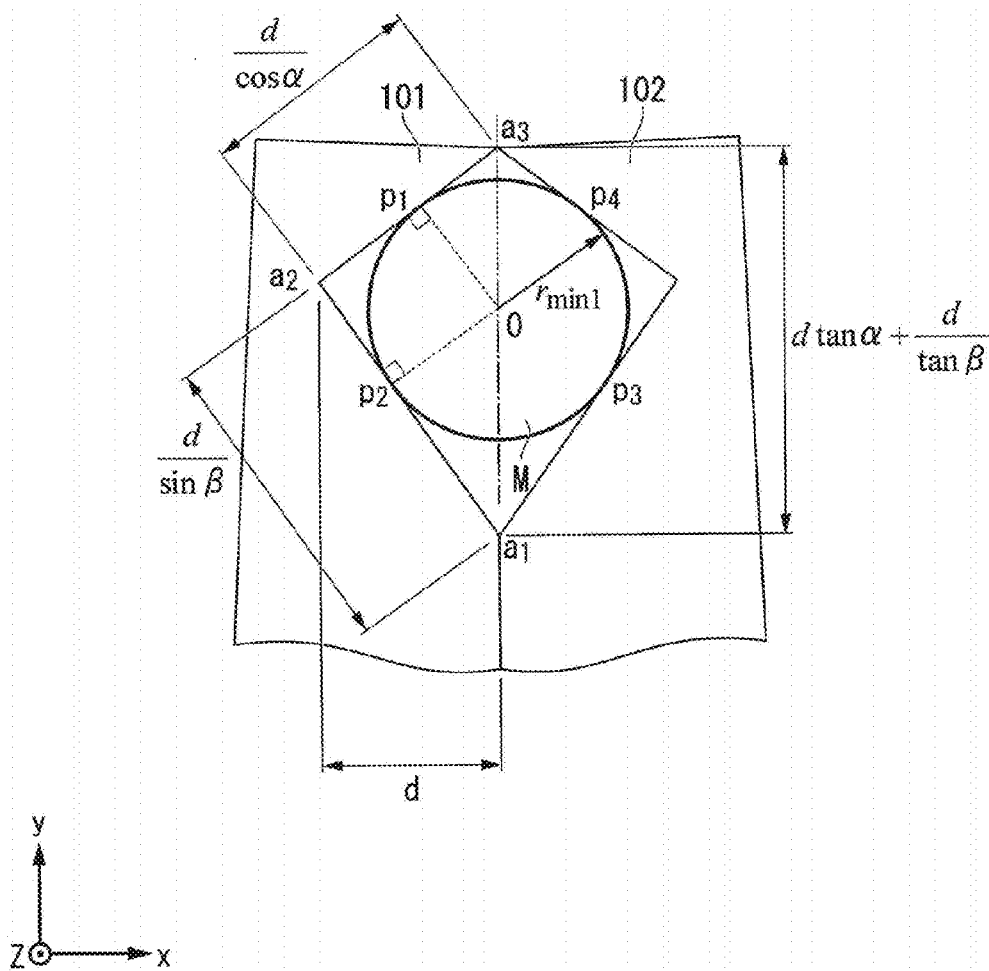
FIG. 19 is a diagram illustrating the minimum size of a part which can be gripped with the claws according to this exemplary embodiment.

FIG. 19 is a diagram illustrating calculation of the minimum size of a part that can be gripped with the claws according to this exemplary embodiment. In this state, as illustrated in (b) of FIG. 18, when the claw 101 and the claw 102 are closed, the part M comes in contact with the surfaces (the first inclined surfaces 111 and 112 and the second inclined surfaces 121 and 122) of the claw 101 and the claw 102 at four contact points $p_1$ to $p_4$. Since the part M is circular, the minimum size $r_{min1}$ of the part M that can be gripped with the claws 101 and 102 is the radius of an inscribed circle when the claws are closed. Accordingly, the minimum gripping size of the part is given by Expression (7) on the basis of the geometrical relationship illustrated in FIG. 19.

$$r_{min1} = \frac{d\cos(\alpha - \beta)}{\cos\alpha + \sin\beta} \quad (7)$$

Caging Condition

The condition of the size of a part M that can be caged (caging condition) will be described below.

FIGS. 20A and 20B are diagrams illustrating parameters of a caging region according to this exemplary embodiment. As illustrated in FIG. 20A, symbol r represents the radius of the part M. In a space S in which the center point o of the part M can move freely, the length in the x direction is defined $c_2$ and the length in the y direction is defined as $c_1$. As illustrated in FIG. 20B, symbol H represents the vertex in the positive y direction of the caging region S and symbol J represents the vertex in the negative y direction. Symbol I represents the vertex in the negative x direction with respect to the segment HJ of the caging region S and symbol K represents the vertex in the positive x direction with respect to the segment HJ. That is, the length $c_1$ in the y direction is the distance between the vertices H and J, and the length $c_2$ in the x direction is the distance between the vertices I and K.

FIGS. 21A and 21B are diagrams illustrating the shape and the parameters of the caging region according to this exemplary embodiment.

Symbols will be first defined. As illustrated in FIGS. 21A and 21B, in the triangles $a_1a_2a_3$ of the claw 101 and the claw 102, symbol $l_2$ represents the distance in the y direction between the vertices $a_3$ and $a_1$. The length $c_1$ in the y direction described with reference to FIGS. 20A and 20B is marked by symbol $c_{11}$ or $c_{12}$ depending on the shape of the caging region. The length $c_2$ in the x direction described with reference to FIGS. 20A and 20B is marked by symbol $c_{21}$, $c_{22}$, $c_{23}$, or $c_{24}$ depending on the shape of the caging region. When the vertex $a_1$ of the triangle $a_1a_2a_3$ is marked by B, symbol $l_1$ represents the distance in the x direction between the point B and the vertex J.

As illustrated in FIGS. 21A and 21B, the length in the y direction is marked by $c_{11}$ or $c_{12}$ depending on the shape of the region surrounded with the vertices I, J, and K of the caging region S. The distance between the tip positions of the claw tips of the claw 101 and the claw 102 is equal to or less than the diameter of the part M. That is, the top of the distance $c_{11}$ is a midpoint between the tip positions of the claw tips of the claw 101 and the claw 102.

Among the segments of the caging region S illustrated in FIG. 21A, the segment between the vertices I and J is a straight line and the segment between the vertices J and K is a straight line. Among the segments of the caging region S, the segment between the vertices H and I is not a straight line and the segment between the vertices H and K is not a straight line. As illustrated in FIG. 21A, the distance between the point B and the vertex J is not equal to r. The length in the y direction of the caging region S in this state is defined as $c_{11}$.

The segment between the vertices I and J of the caging region S illustrated in FIG. 21B includes a straight line and a curve. Among the segments of the caging region S, the segment between the vertices H and I and the segment between the vertices H and K include a straight line and a curve. As illustrated in FIG. 21B, the distance between the point B and the vertex J is r. The length in the y direction of the caging region S in this state is defined as $c_{12}$.

As illustrated in FIGS. 21A and 21B, the distance $c_1$ in the y direction of the caging region S is divided as expressed by Expression (8).

$$c_1 = \begin{cases} c_{11}, & \text{if } l_1 < r\cos(\beta + \theta) \\ c_{12}, & \text{if } l_1 \geq r\cos(\beta + \theta) \end{cases} \quad (8)$$

The lengths $c_{11}$ and $c_{12}$ in the y direction of the caging region S are given by Expressions (9) and (10) from the geometrical relationships illustrated in FIGS. 21A and 21B.

$$c_{11} = l_2 - \left(\frac{r}{\sin(\beta+\theta)} - \frac{l_1}{\tan(\beta+\theta)}\right) \quad (9)$$

$$c_{12} = l_2 - \sqrt{r^2 - l_1^2} \quad (10)$$

In Expressions (9) and (10), the distance $l_2$ and the distance $l_2$ are given by Expressions (11) and (12).

$$l_1 = l\cos\gamma - l\cos(\gamma+\theta) \quad (11)$$

$$l_2 = \left(d\tan\alpha + \frac{d}{\tan\beta}\right)\cos\theta \quad (12)$$

In Expressions (11) and (12), the angle θ is given by Expression (13).

$$\theta = 2\tan^{-1}\left(\frac{-a + \sqrt{a^2 + b^2 + c^2}}{c - b}\right) \quad (13)$$

In Expression (13), a, b, and c are given by Expressions (14), (15), and (16), respectively.

$$a = d\tan\alpha + \frac{d}{\tan\beta} + l\sin\gamma \quad (14)$$

$$b = -l\cos\gamma \quad (15)$$

$$c = l\cos\gamma - r \quad (16)$$

The distance $c_2$ in the x direction of the caging region S is distinguished into $c_{21}$ to $c_{24}$ depending on the shape of the caging region S as illustrated in FIGS. 22 to 25.

Figure 22:
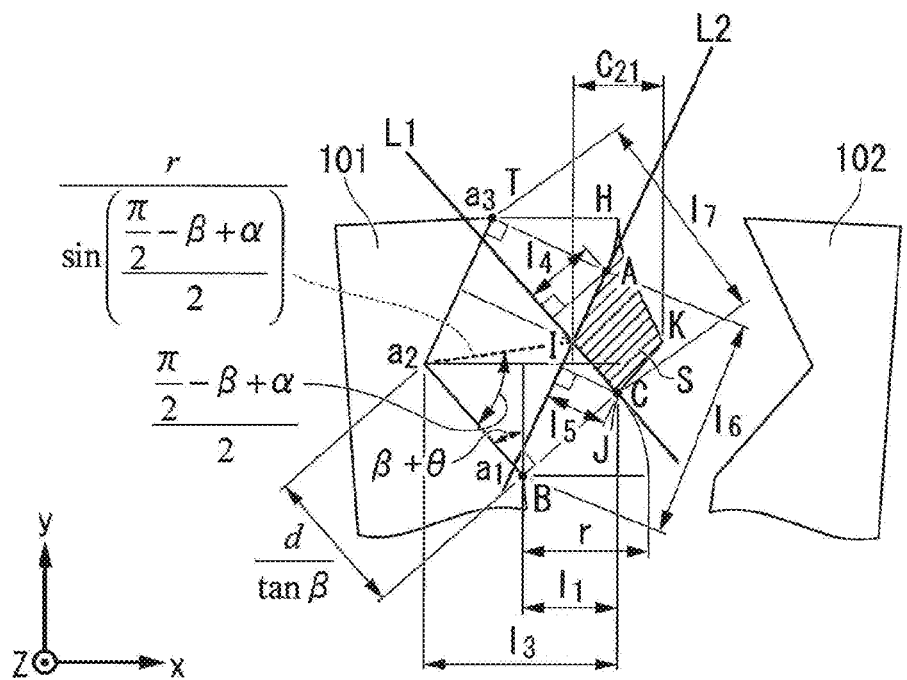
FIG. 22 is a diagram illustrating an example in which the distance in the x direction of the caging region according to this exemplary embodiment is $c_{21}$.
Figure 23:
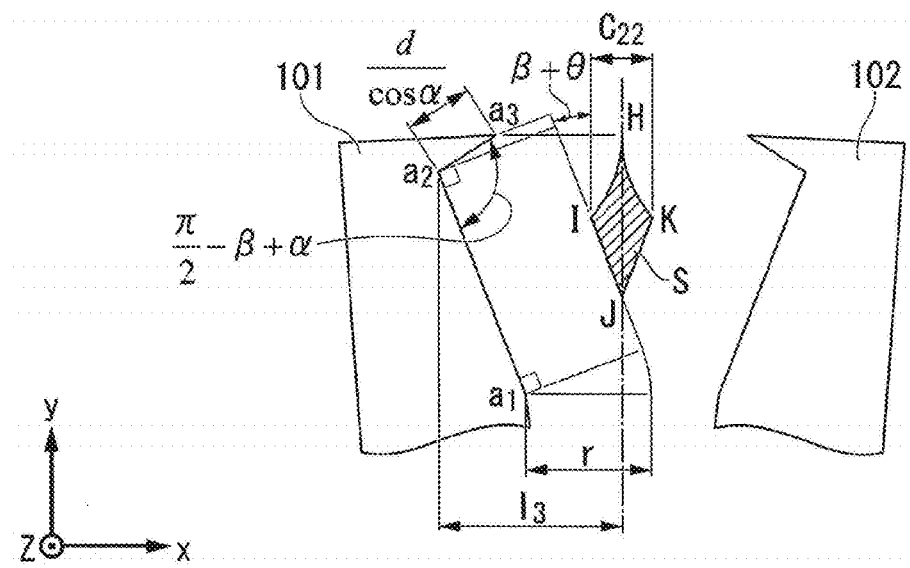
FIG. 23 is a diagram illustrating an example in which the distance in the x direction of the caging region according to this exemplary embodiment is $c_{22}$.
Figure 24:
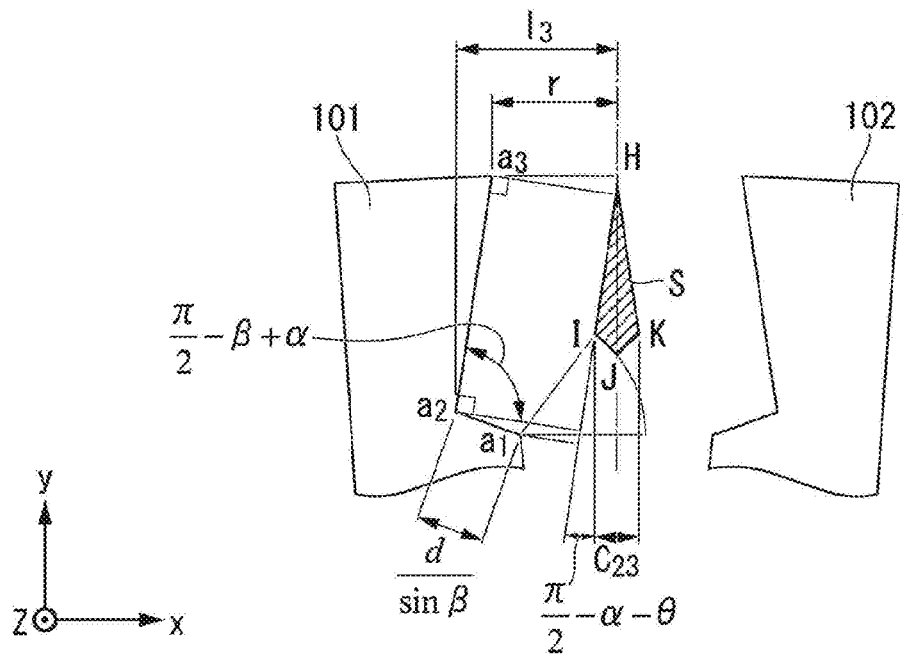
FIG. 24 is a diagram illustrating an example in which the distance in the x direction of the caging region according to this exemplary embodiment is $c_{23}$.
Figure 25:
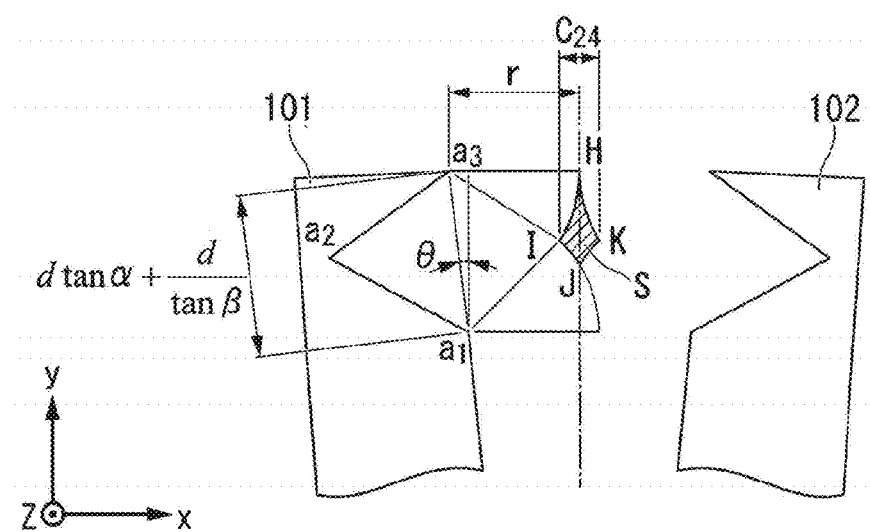
FIG. 25 is a diagram illustrating an example in which the distance in the x direction of the caging region according to this exemplary embodiment is $c_{24}$.

FIG. 22 is a diagram illustrating a case in which the distance in the x direction of the caging region is $c_{21}$ according to this exemplary embodiment. FIG. 23 is a diagram illustrating a case in which the distance in the x direction of the caging region is $c_{22}$ according to this exemplary embodiment. FIG. 24 is a diagram illustrating a case in which the distance in the x direction of the caging region is $c_{23}$ according to this exemplary embodiment. FIG. 25 is a diagram illustrating a case in which the distance in the x direction of the caging region is $c_{24}$ according to this exemplary embodiment.

First, symbols used in FIGS. 22 to 25 are defined. Symbol T represents the vertex $a_3$ of the triangle $a_1a_2a_3$ of the claw 101 and symbol B represents the vertex $a_1$. Symbol C represents the vertex J of the caging region S. Symbol L1 represents a straight line passing through a segment connecting the vertex J and the vertex I of the caging region S. Symbol A represents the end point of the straight range between the vertex I and the vertex H. That is, in FIG. 22, the segment IA is a straight line and the segment AH is a curve.

The straight line L2 is a straight line passing through the straight range IA between the vertex I and the vertex H of the caging region S. Symbol $l_3$ represents the distance in the x direction between the vertex J of the caging region S and the vertex $a_2$ of the triangle $a_1a_2a_3$ of the claw 101. Symbol $l_4$ represents the distance between the point A (boundary (upper side) between an arc and a straight line) and the straight line L1, and symbol $l_5$ represents the distance between the point C (boundary (lower side) between an arc and a straight line) and the straight line L2. Symbol $l_6$ represents the distance between the point A and the point B (the claw tip) and Symbol $l_7$ represents the distance between the point C and the point T (the claw tip).

As illustrated in FIGS. 22 to 25, the distance $c_2$ between the vertices I and K of the caging region S is distinguished as expressed by Expression (17).

$$c_2 = \begin{cases} c_{21}, & \text{if } (l_4 \geq 0 \land l_5 \geq 0) \\ c_{22}, & \text{if } (l_4 < 0 \land l_5 \geq 0) \lor ((l_4 < 0 \land l_5 < 0) < (l_6 < r \land l_7 \geq r)) \\ c_{23}, & \text{if } (l_4 \geq 0 \land l_5 < 0) \lor ((l_4 < 0 \land l_5 < 0) \land (l_6 \geq r \land l_7 < r)) \\ c_{24}, & \text{if } (l_4 < 0 \land l_5 < 0) \land ((l_6 \geq r \land l_7 \geq r) \lor (l_6 < r \land l_7 < r)) \end{cases} \quad (17)$$

In Expression (17), . . . ∧ ~ represents a logical product (AND) of . . . and ~, and . . . ∨ ~ represents a logical sum (OR) of . . . and ~. If $l_4$ is greater than 0 (zero), it means that a straight region is present between the vertex I and the vertex H of the caging region S. If $l_4$ is less than 0 (zero), it means that a straight region is not present between the vertex I and the vertex H of the caging region S, that is, that a curve region is present therebetween. If $l_4$ is equal to or greater than 0 (zero), it means that a straight region and a curve region are present between the vertex I and the vertex H of the caging region S.

As illustrated in FIG. 22, in the caging region S having the distance $c_{21}$, the segment between the vertex H and the vertex I includes a straight line and a curve, and the segment between the vertex I and the vertex J includes only a straight line. As illustrated in FIG. 23, in the caging region S having the distance $c_{22}$, the segment between the vertex H and the vertex I includes only a curve, and the segment between the vertex I and the vertex J includes only a straight line. As illustrated in FIG. 24, in the caging region S having the distance $c_{23}$, the segment between the vertex H and the vertex I includes a straight line and a curve, and the segment between the vertex I and the vertex J includes only a curve. As illustrated in FIG. 25, in the caging region S having the distance $c_{24}$, the segment between the vertex H and the vertex I includes only a curve, and the segment between the vertex I and the vertex J includes only a curve.

The lengths $c_{21}$ to $c_{24}$ in the x direction of the caging region S are given by Expressions (18) to (21) from the geometrical relationships illustrated in FIGS. 22 to 25.

$$c_{21} = 2l_3 - \frac{2r\cos\left(\frac{\frac{\pi}{2}-\beta-\alpha}{2} - \theta\right)}{\sin\left(\frac{\frac{\pi}{2}-\beta+\alpha}{2}\right)} \quad (18)$$

$$c_{22} = 2l_3 - 2r\cos(\beta+\theta) - \frac{2\sin(\beta+\theta)}{\cos\alpha}\left(d\sin(\beta-\alpha) + \sqrt{2dr\cos\alpha\cos(\beta-\alpha) - d^2\cos^2(\beta-\alpha)}\right) \quad (19)$$

$$c_{23} = 2l_3 - 2r\sin(\alpha+\theta) - \frac{2\cos(\alpha+\theta)}{\sin\beta}\left(d\sin(\beta-\alpha) + \sqrt{2dr\sin\beta\cos(\beta-\alpha) - d^2\cos^2(\beta-\alpha)}\right) \quad (20)$$

$$c_{24} = 2r - \left(d\tan\alpha + \frac{d}{\tan\beta}\right)\sin\theta - \cos\theta\sqrt{4r^2 - \left(d\tan\alpha + \frac{d}{\tan\beta}\right)^2} \quad (21)$$

In Expressions (18) to (21), $l_3$ to $l_7$ and the angle $\theta$ are given by Expressions (22) to (26) and Expression (27), respectively.

$$l_3 = l\cos\gamma - l\cos(\gamma + \theta) + \frac{d\sin(\beta + \theta)}{\sin\beta} \quad (22)$$

$$l_4 = \frac{d\cos(\alpha - \beta)}{\cos\alpha} + r\sin(\alpha - \beta) - r \quad (23)$$

$$l_5 = \frac{d\cos(\alpha - \beta)}{\sin\beta} + r\sin(\alpha - \beta) - r \quad (24)$$

$$l_6 = \sqrt{r^2 + \left(d\tan\alpha + \frac{d}{\tan\beta}\right)^2 - 2r\left(d\tan\alpha + \frac{d}{\tan\beta}\right)\cos\alpha} \quad (25)$$

$$l_7 = \sqrt{r^2 + \left(d\tan\alpha + \frac{d}{\tan\beta}\right)^2 - 2r\left(d\tan\alpha + \frac{d}{\tan\beta}\right)\sin\beta} \quad (26)$$

$$\theta = 2\tan^{-1}\left(\frac{-a + \sqrt{a^2 + b^2 - c^2}}{c - b}\right) \quad (27)$$

In Expression (27), a, b, and c are given by Expressions (28), (29), and (30), respectively.

$$a = d\tan\alpha + \frac{d}{\tan\beta} + l\sin\gamma \quad (28)$$

$$b = -l\cos\gamma \quad (29)$$

$$c = l\cos\gamma - r \quad (30)$$

The larger the caging region S becomes, the robuster gripping to the position error of the part M is possible. The larger the part M becomes, the smaller the values of the distances $c_1$ and $c_2$ of the caging region S becomes. Accordingly, the size of the part M in which the distance $c_1$ or $c_2$ is less than the minimum allowable position error $C_{lim}$ determined in advance corresponds to the maximum caging size $r_{max2}$. The maximum caging size $r_{max2}$ is given by Expressions (8) and (17).

Figure 26:
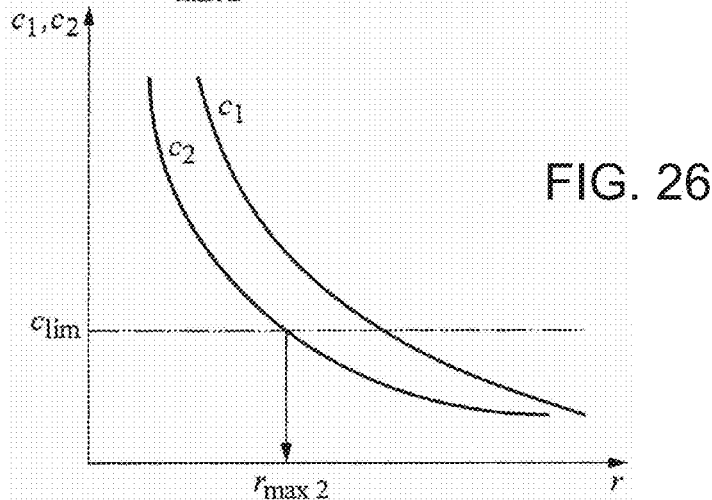
FIG. 26 is a diagram illustrating a relationship between the maximum size which can be caged and distances $c_2$, and $c_{lim}$ according to this exemplary embodiment.

FIG. 26 is a diagram illustrating the relationship between the maximum caging size $r_{max2}$ and the distances $c_1$, $c_2$, and $c_{lim}$ according to this exemplary embodiment. In FIG. 26, the vertical axis represents the distances $c_1$, $c_2$, and $c_{lim}$ and the horizontal axis represents the radius of the part M. As illustrated in FIG. 26, the smaller value of r of the intersections between the curves of the distances $c_1$ and $c_2$ and the minimum value $C_{lim}$ is selected as the maximum caging size $r_{max2}$. For example, when $c_{12}$ is selected in Expression (8) and $c_{21}$ is selected in Expression (17), the smaller value of r of the intersections between the curves of the distances $c_{12}$ and $c_{21}$ and the minimum value $C_{lim}$ is selected as the maximum caging size $r_{max2}$.

The minimum value $C_{lim}$ is an allowable position error. The allowable position error is a range (caging region S) in which the part M can move freely in a state in which the caging is established. For example, when the minimum value $C_{lim}$ is 2.0 [mm], the distance $c_1$ or $c_2$ is 2.0 [mm]. This value means that the caging of the part M with $r_{max2}$ is possible when the position detection error using an image or the positioning error of the hand 40 is in the range of the caging region S with $c_1$ or $c_2$ of 2.0 [mm].

Self Alignment Condition

The size condition of a part M that can be subjected to self alignment (self alignment condition) will be described below.

Figure 27A:
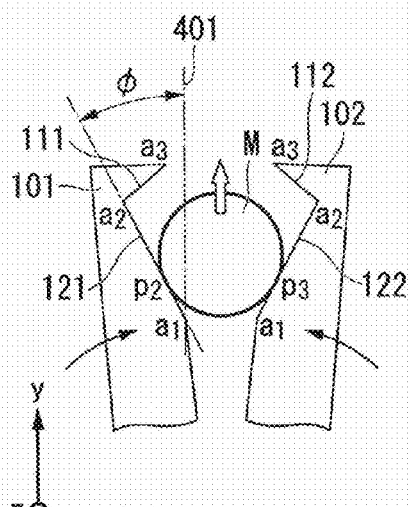
FIGS. 27A and 27B are diagrams illustrating self alignment conditions according to this exemplary embodiment.
Figure 27B:
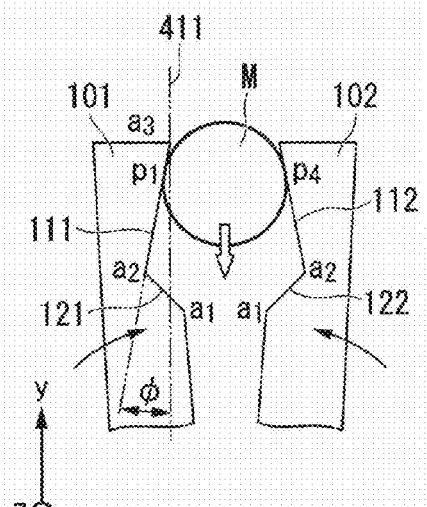

FIGS. 27A and 27B are diagrams illustrating the self alignment condition according to this exemplary embodiment. As illustrated in FIG. 27A, the part M comes in contact with the second inclined surfaces 121 and 122 of the claw 101 and the claw 102 at the contact points $p_2$ and $p_3$. In this state, when the claw 101 and the claw 102 moves in the direction in which both get close to each other, that is, both is closed, the part M moves in the positive y direction. Accordingly, the self alignment is performed (also referred to as upward self alignment). In FIG. 27A, symbol $\phi$ represents the angle formed by the segment $a_1a_2$ of the claw 101 and a segment 401 parallel to the y direction with the vertex $a_1$ as a start point.

As illustrated in FIG. 27B, the part M comes in contact with the first inclined surfaces 111 and 112 of the claw 101 and the claw 102 at the contact points $p_1$ and $p_4$. In this state, when the claw 101 and the claw 102 moves in the direction in which both get close to each other, that is, both is closed, the part M moves in the negative y direction. Accordingly, the self alignment is performed (also referred to as downward self alignment). In FIG. 27B, symbol $\phi$ represents the angle formed by the segment $a_3a_2$ of the claw 101 and a segment 411 parallel to the y direction with the vertex $a_3$ as a start point. This angle $\phi$ is a contact angle of the claw 101 and the part M.

Figure 28A:
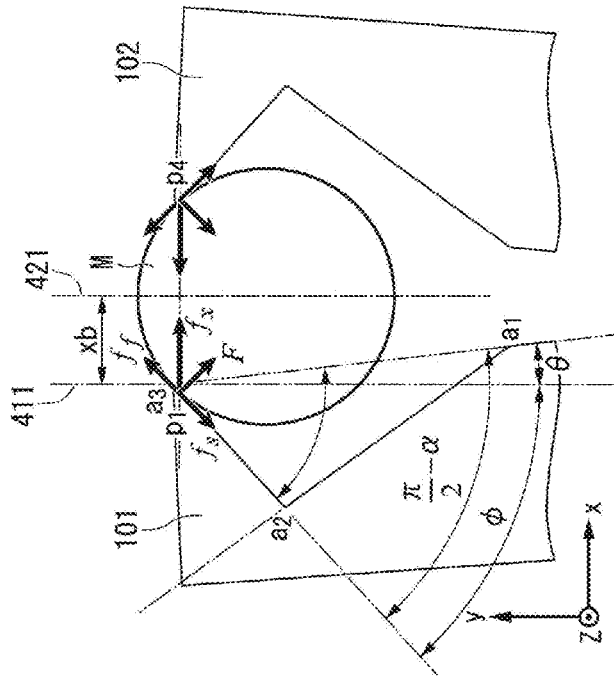
FIGS. 28A and 28B are diagrams illustrating a force applied to a part from the claws according to this exemplary embodiment.
Figure 28B:
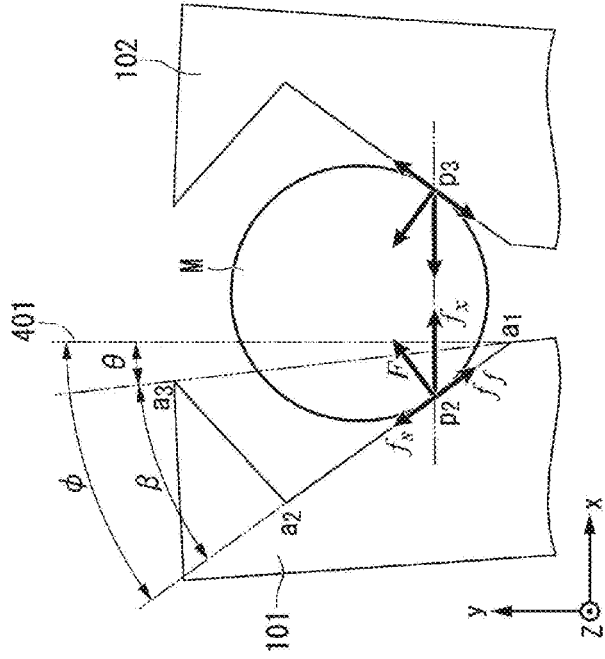

FIGS. 28A and 28B are diagrams illustrating a force applied to a part from the claws according to this exemplary embodiment. FIG. 28A is a diagram illustrating the force applied to the part from the claws at the time of upward self alignment similarly to FIG. 27A. FIG. 28B is a diagram illustrating the force applied to the part from the claws at the time of upward self alignment similarly to FIG. 27B. In FIG. 28B, symbol xb represents the distance from the vertex $a_3$ of the claw 101 to a segment 421 passing through the center point o of the part M.

Figure 29:
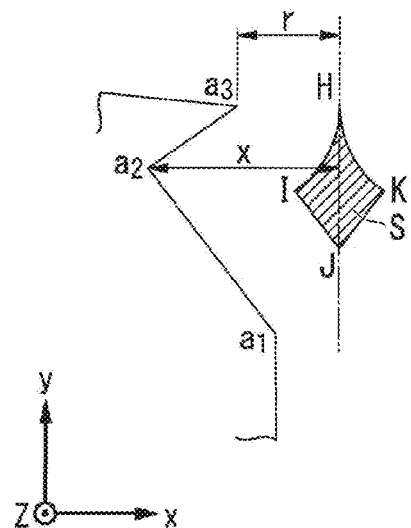
FIG. 29 is a diagram illustrating a relationship between a radius of a part and the vertices according to this exemplary embodiment.

FIG. 29 is a diagram illustrating the relationship between the radius r of the part M and the vertex $a_2$ according to this exemplary embodiment.

As illustrated in FIGS. 28A and 28B, among the force F applied to the part M from the claw 101 and the claw 102, the force $f_s$ in the claw direction (the direction of the segment $a_2a_1$ or the direction of the segment $a_3a_2$) and the force $f_x$ in the x direction are given by Expression (31).

$$\begin{cases} f_s = F\tan\phi \\ f_x = \dfrac{F}{\cos\phi} \end{cases} \quad (31)$$

The frictional force $f_f$ acting on the part M is given by Expression (32), where $\mu$, is a friction coefficient.

$$f_f = \mu F \quad (32)$$

From Expressions (31) and (32), the condition in which the part M moves by closing the claw 101 and the claw 102 is given by Expression (33).

$$\phi > \tan^{-1}\mu \quad (33)$$

In the following description, $\tan^{-1}\mu$ in Expression (31) may be expressed by $\phi_{lim}$.

The self alignment condition in the upward self alignment will be described below. As illustrated in (b) of FIG. 19, the contact angle φ is expressed by φ=β+θ. The contact angle φ decreases with the closing of the claw 101 and the claw 102. Accordingly, in a range in which β is less than $\phi_{lim}$, the movement of part M may be stopped in the middle of self alignment. Accordingly, the minimum size $r_{min2}$ of the part M that can be subjected to upward self alignment is given by Expression (34) from the geometrical relationship illustrated in FIG. 28A.

$$r_{min2} = \begin{cases} \dfrac{\left(\dfrac{d\sin\phi_{lim}}{\sin\beta} + l\cos\gamma - l\cos(\gamma + \phi_{lim} - \beta)\right) \times \sin\left(\dfrac{\dfrac{\pi}{2} - \beta + \alpha}{2}\right)}{\cos\left(\dfrac{\dfrac{\pi}{2} - \beta + \alpha}{2} - \left(\dfrac{\pi}{2} - \phi_{lim}\right)\right)}, & \text{if } \beta \leq \phi_{lim} \\ 0, & \text{if } \beta > \phi_{lim} \end{cases} \quad (34)$$

Expression (34) is modified to Expression (35) by substituting $\tan^{-1}\mu$ for $\phi_{lim}$.

$$r_{min2} = \begin{cases} \dfrac{\left(\dfrac{d\sin(\beta+\theta)}{\sin\beta} + l\cos\gamma - l\cos(\theta+\gamma)\right) \times \sin\left(\dfrac{\dfrac{\pi}{2} - \beta + \alpha}{2}\right)}{\cos\left(\dfrac{\dfrac{\pi}{2} - \beta + \alpha}{2} - \left(\dfrac{\pi}{2} - (\beta+\theta)\right)\right)}, & \text{if } \beta \leq \phi_{lim} \\ 0, & \text{if } \beta > \phi_{lim} \end{cases} \quad (35)$$

The self alignment condition in the downward self alignment will be described below. As illustrated in FIG. 28B, the contact angle φ is given by Expression (36).

$$\phi = \frac{\pi}{2} - \alpha - \theta \quad (36)$$

Expression (36) represents that the contact angle φ increases with the closing of the claw 101 and the claw 102. In a range in which (π/2−α) is equal to or greater than $(\tan^{-1}\mu)$, the self alignment is possible when the claws 101 and 102 are most opened. Accordingly, the maximum size $r_{max3}$ of the part M that can be subjected to downward self alignment is given by Expression (37) from the geometrical relationship illustrated in FIG. 28B.

$$r_{max3} = \begin{cases} 0, & \text{if } \dfrac{\pi}{2} - \alpha < \phi_{lim} \\ \dfrac{\left(d\tan\alpha + \dfrac{d}{\tan\beta}\right)\cos(\alpha + \phi_{lim})}{\cos\phi_{lim}} + \\ \quad \dfrac{l\cos\gamma - l\sin(\alpha + \phi_{lim} - \gamma)}{\cos\phi_{lim}}, & \text{if } \dfrac{\pi}{2} - \alpha \geq \phi_{lim} \end{cases} \quad (37)$$

Expression (38) is obtained by substituting Expression (36) for Expression (37).

$$r_{max3} = \begin{cases} 0, & \text{if } \dfrac{\pi}{2} - \alpha < \phi_{lim} \\ \dfrac{\left(d\tan\alpha + \dfrac{d}{\tan\beta}\right)\cos\left(\dfrac{\pi}{2} - \theta\right)}{\cos\left(\dfrac{\pi}{2} - \alpha - \theta\right)} + \\ \quad \dfrac{l\cos\gamma - l\sin\left(\dfrac{\pi}{2} - \theta - \gamma\right)}{\cos\left(\dfrac{\pi}{2} - \alpha - \theta\right)}, & \text{if } \dfrac{\pi}{2} - \alpha \geq \phi_{lim} \end{cases} \quad (38)$$

As described above, the maximum caging size $r_{max2}$ of the part M is given by Expressions (8) and (17) on the basis of the caging condition. The minimum size $r_{min2}$ of the part M that can be subjected to the upward self alignment is given by Expression (35) and the maximum size $r_{max3}$ of the part M that can be subjected to the downward self alignment is given by Expression (38).

From the aforementioned description, the sizes and shapes of the claws 101 and 102 of the hand 40 are given in the range in which the frictional gripping condition, the caging condition, and the self alignment condition are satisfied for the part M (the radius r of the axis portion of the workpiece Wk). This range is as follows. The minimum size $r_{min}$ of the part M is the larger value of the minimum size $r_{min1}$ of the part M that can be subjected to the frictional gripping and the minimum size $r_{min2}$ of the part M that can be subjected to the self alignment from the base ends to the tips. The maximum size $r_{max}$ of the part M is the smallest value among the maximum size $r_{max1}$ of the part M that can be subjected to the frictional gripping, the maximum size $r_{max2}$ of the part M with which the area in which the center of the part M is movable is the maximum, and the maximum size $r_{max3}$ of the part M that can be subjected to the self alignment from the base ends to the tips.

The tips of the claws 101 and 102 do not mean only the ends in the strict meaning, but may include side surfaces on the front side including a straight line passing through the point $a_1$ and the point $a_3$ or a portion similar thereto, for example, as illustrated in FIG. 13A. Similarly, the base ends of the claws 101 and 102 do not mean only the ends in the strict meaning, but may include side surfaces on the rear side including a straight line passing through the point $a_1$ and the point $a_3$ or a portion similar thereto, for example, as illustrated in FIG. 13A.

As described above, the robot 10 according to this exemplary embodiment includes the hand 40 gripping an object (for example, the workpiece Wk) and the control unit 60 operating the hand 40. The hand 40 includes fingers 41 and 42 that are able to grip an object at four or more contact points and the hand 40 grips an object of which a metallic tone index is equal to or higher than 5.

According to this configuration, since the fingers 41 and 42 can grip an object at four or more contact points, it is possible to stably grip objects, which have been piled in a random manner, having a metallic gloss.

In the robot 10, the control unit 60 includes the position and attitude calculating unit 602 that calculates the position and attitude of the object on the basis of a three-dimensional point group obtained by imaging the object and the grip planning unit 604 that determines the opening and closing direction (for example, the z" direction (FIG. 9B)) of the fingers 41 and 42 in the direction perpendicular to the length direction (for example, the y' direction) of the object and the imaging direction (for example, the z direction) of the object.

According to this configuration, since the imaging direction of the object and the opening and closing direction of the fingers are perpendicular to each other, an error in the imaging direction of the position of the object based on imaging data is greater than that in the other directions and an error in the opening and closing direction of the fingers is smaller than the other directions. Accordingly, accumulation of the error is not concentrated on a specific direction. Since the fingers are opened and closed in the direction perpendicular to the length direction of the object, the hand can satisfactorily grip the object.

In the robot 10, the grip planning unit 604 causes the hand 40 to approach the object from a point (for example, the gripping standby point P') spaced apart by a predetermined distance from the position of the object in a direction perpendicular to the length direction of the object and not having a component parallel to the plane (for example, the work plane) on which the object is placed.

According to this configuration, the hand 40 approaches the objects in the direction not having a component parallel to the object to be gripped and the plane on which the object is placed with the point (for example, the gripping standby point P') spaced apart by a predetermined distance from the position of the object as a base point. Accordingly, since the possibility that the hand will come in contact with the object or the plane (for example, the work plane) on which the object is placed can be reduced, it is possible to satisfactorily grip the object.

In the robot 10, the grip planning unit 604 inclines the fingers 41 and 42 in the same direction as the inclination of the length direction of the object from the direction perpendicular to the plane when the angle (for example, the angle θ) between the plane and the length direction of the object is equal to or greater than a predetermined angle threshold (for example, 20°).

According to this configuration, when the inclination of the object from the plane on which the object is placed is great, the opening and closing direction of the fingers is inclined in a direction closer to the direction perpendicular to the length direction of the object depending on the inclination. Accordingly, even when the hand approaches the object from the direction perpendicular to the length direction of the object, it is possible to satisfactorily grip the object.

In the robot 10, the control unit 60 includes the attitude control unit 606 that adjusts attitude of the object by changing a force for gripping the object with the hand 40.

According to this configuration, since the attitude of the gripped object is autonomously adjusted, it is possible to skip or save manual operations associated with the adjustment.

In the robot 10, the fingers 41 and 42 have a shape and a size enabling the caging and the self alignment on the object.

According to this configuration, when adjusting the attitude of the object, it is possible to utilize a gravitational force applied to the object by reducing the force for gripping the object with the hand 40. By increasing the force for gripping the object with the hand 40, it is possible to adjust the attitude of the object depending on the shape of the surfaces (for example, the first inclined surfaces 111 and 112 and the second inclined surfaces 121 and 122) on which the pair of fingers 41 and 42 face each other.

Modification Examples

The technical scope of the invention is not limited to the aforementioned exemplary embodiment, but can be modified in various forms without departing from the gist of the invention.

The aforementioned exemplary embodiment has described the example in which a workpiece Wk has a cylindrical shape or a shape similar to a cylinder, but the invention is not limited to this configuration. The shape of the workpiece Wk may be any shape that can be approximated into a long and narrow shape in which the length of one side is longer than that of the other sides, such as polygonal prisms such as a triangular prism and a rectangular prism or shapes similar to the polygonal prisms.

When a workpiece Wk does not have a portion (for example head Hd) of which the diameter is greater than the diameter of the other portions, the direction checking unit 605 and the attitude control unit 606 may not be provided. When the direction checking unit 605 is not provided, the imaging device 80 may not include the function of capturing a two-dimensional image, and the image data acquiring unit 601 may not perform the process of extracting two-dimensional image data.

The method of causing the imaging device 80 to acquire a three-dimensional point group indicating the shape of a subject is not limited to the phase shift method. Any method (for example, a time-of-flight method) may be employed as long as it can acquire the three-dimensional coordinates of sample points.

The method of causing the position and attitude estimating unit 602 to calculate the attitude of an object is not limited to the RANSAC method. Any method (for example, a minimum norm method) may be employed as long as it can calculate the attitude of an object. The number of sets of a position and attitude of an object which is calculated by the position and attitude estimating unit 602 may be one. In this case, the gripping difficulty level calculating unit 603 may not be provided.

The gripping difficulty level calculating unit 603 may not calculate the evaluation index value using all of the first to fourth evaluation index values. The gripping difficulty level calculating unit 603 may determine the evaluation index value using any one or any combination of the first to fourth evaluation index values.

The grip planning unit 604 may skip the process (step S405 in FIG. 8) of rotating the hand 40 by a predetermined angle φ' in the x'-y' plane with a workpiece Wk held therein.

The aforementioned embodiment has described the premise that the length (height) or radius of an object is set in advance by the control unit 60, but the invention is not limited to this configuration. The control unit 60 may acquire the length and radius from an input unit (not illustrated) capable of inputting the length and radius with a user's operation. The robot 10 may include a communication unit (not illustrated) capable of receiving the length and radius via a communication line.

The imaging device 80 may output image data pieces by frames to the robot 10 or may sequentially output the image data pieces to the robot 10 for every predetermined time interval. The imaging device 80 may be incorporated into the robot 10.

The control unit 60 may be constructed as a controller independent of the robot 10 as long as it can transmit and receive a variety of data to and from the imaging device 80, the moving mechanism 12, and the detection unit 63.

The degrees of freedom of the robot 10 are not limited to six axes, but may be set to seven or more axes or five or less axes.

The robot 10 is a single-arm robot including a set of the arm 20 and the hand 40, but the invention is not limited to this configuration. The numbers of arm 20 and the number of hands 40 may be greater than one.

Figure 30:
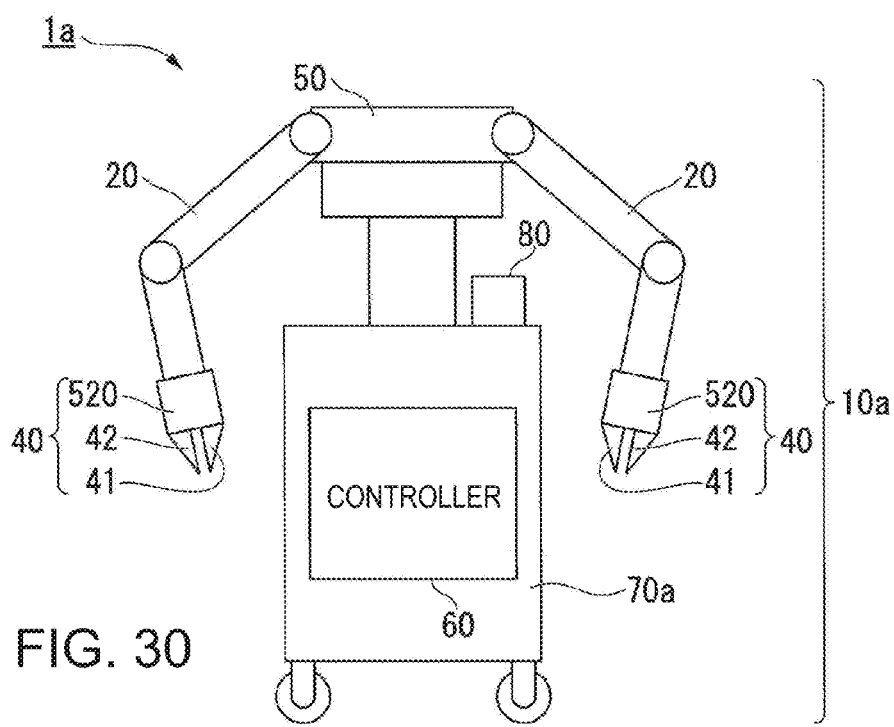
FIG. 30 is a diagram illustrating a configuration of a robot system according to a modification example of this exemplary embodiment.

FIG. 30 is a diagram illustrating a configuration of a robot system 1a of a modification example.

The robot system 1a includes a robot 10a.

The robot 10a is a two-arm robot including two sets of the arm 20 and the hand 40. The control unit 60 can independently control the operations of two sets of the arm 20 and the hand 40. The robot 10a includes a storage unit 70a and the control unit 60 is received in the storage unit 70a. The imaging device 80 may be installed on the top surface of the storage unit 70a. Vehicle wheels may be attached to the bottom surface of the storage unit 70a and thus the entire robot system 1a may move with an application of an external force.

The aforementioned processes of the control unit may be performed by recording a program for performing the processes of a part or all of the control unit 60, for example, the image data acquiring unit 601, the position and attitude estimating unit 602, the gripping difficulty level calculating unit 603, the grip planning unit 604, the direction checking unit 605, and the attitude control unit 606, on a computer-readable recording medium and causing a computer system to read and execute the program recorded on the recording medium.

Here, the "computer system" may include an operating system (OS) or hardware such as peripherals in addition to hardware such as a central processing unit (CPU) or a graphical processing unit (GPU) performing the aforementioned processes. The "computer system" may include a WWW system including a homepage providing environment (or display environment). Examples of the "computer-readable recording medium" include writable nonvolatile memories such as a flexible disk, a magneto-optical disk, a ROM, and a flash memory, portable mediums such as a compact disc (CD)-ROM, and a storage device such as a hard disk built in a computer system.

The "computer-readable recording medium" may include a medium that temporarily holds a program for a predetermined time, like a volatile memory (for example, a dynamic random access memory (RAM)) inside a computer system serving as a server or a client in a case where the program is transmitted via a network such as the Internet or a communication circuit such as a telephone circuit. The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) such as the Internet or a communication circuit (communication line) such as a telephone line. The program may be configured to realize a part of the above-mentioned functions or may be configured to realize the above-mentioned functions by combination with a program recorded in advance in a computer system, like a so-called differential file (differential program).

While the exemplary embodiment of the invention has been described above in detail with reference to the accompanying drawings, the invention is not limited to the exemplary embodiment but may include designs or the like without departing from the gist of the invention.

The entire disclosure of Japanese Patent Application No. 2014-061478, filed Mar. 25, 2014 is expressly incorporated by reference herein.

What is claimed is:

1. A robot comprising:
a hand that grips an object; and
a control unit that operates the hand,
wherein the hand includes fingers that are able to grip the object at four or more contact points,
wherein the object of which a metallic tone index is equal to or higher than 5 is gripped with the hand, and
wherein the control unit includes:
a position and attitude calculating unit that calculates position and attitude of the object on the basis of a three-dimensional point group obtained by imaging the object; and
a grip planning unit that determines an opening and closing direction of the fingers in a direction perpendicular to a length direction of the object and an imaging direction of the object,
wherein the grip planning unit causes the hand to approach the object from a point spaced apart by a predetermined distance from the position of the object in a direction perpendicular to the length direction of the object and not having a component parallel to a plane on which the object is placed, and
wherein the grip planning unit inclines the fingers in the same direction as the inclination of the length direction of the object about the plane from the direction perpendicular to the plane when an angle between the plane and the length direction of the object is equal to or greater than a predetermined angle threshold.

2. The robot according to claim 1, wherein the control unit includes an attitude control unit that adjusts an attitude of the object by changing a force for gripping the object with the hand.

3. The robot according to claim 2, wherein the fingers have a shape and a size enabling caging and self alignment on the object.

* * * * *